(12) United States Patent  
Suzue et al.

(10) Patent No.: US 12,098,219 B2  
(45) Date of Patent: Sep. 24, 2024

(54) METHOD FOR DRYING POLYOLEFIN-CONTAINING PARTICLES AND METHOD FOR STORING POLYOLEFIN-CONTAINING PARTICLES

(71) Applicant: Sumitomo Chemical Company, Limited, Tokyo (JP)

(72) Inventors: Masato Suzue, Ichihara (JP); Satoshi Itoguchi, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 55 days.

(21) Appl. No.: 17/895,218

(22) Filed: Aug. 25, 2022

(65) Prior Publication Data

US 2023/0080886 A1   Mar. 16, 2023

(30) Foreign Application Priority Data

Aug. 30, 2021   (JP) .................................. 2021-140255

(51) Int. Cl.
  *C08F 10/06*   (2006.01)
  *F26B 17/12*   (2006.01)
(52) U.S. Cl.
  CPC .................................. *C08F 10/06* (2013.01)
(58) Field of Classification Search
  CPC ........ C08F 10/06; C08F 201/06; C08F 20/01; F26B 17/12; F26B 25/06
  See application file for complete search history.

(56) References Cited

U.S. PATENT DOCUMENTS

| | | | |
|---|---|---|---|
| 5,799,412 A | * | 9/1998 | Yamamoto .............. F26B 17/14 34/582 |
| 9,181,367 B2 | | 11/2015 | Chamayou et al. |
| 2015/0315302 A1 | | 11/2015 | Penzo et al. |
| 2020/0308317 A1 | | 10/2020 | Arakawa |

FOREIGN PATENT DOCUMENTS

| | | |
|---|---|---|
| JP | 2015537102 A | 12/2015 |
| JP | 2016204648 A | 12/2016 |
| JP | 2020164827 A | 10/2020 |

* cited by examiner

*Primary Examiner* — Catherine S Branch  
(74) *Attorney, Agent, or Firm* — Panitch Schwarze Belisario & Nadel LLP

(57) ABSTRACT

A method for drying polyolefin-containing particles includes a drying step of supplying polyolefin-containing particles to a drying container and drying the polyolefin-containing particles in the drying container. In the drying step, a value determined by the following formula (a) is −0.20 or more and 1.05 or less.

0.00304×apparatus diameter [m]+0.00261×bed height [m]+0.0179×residence time [hr]+ 0.00213×particle temperature in drying container [K]−0.0109×inclination angle [degree]+ 0.0212×CXS component amount [% by mass]   Formula (a):

12 Claims, 3 Drawing Sheets

[Fig. 1]
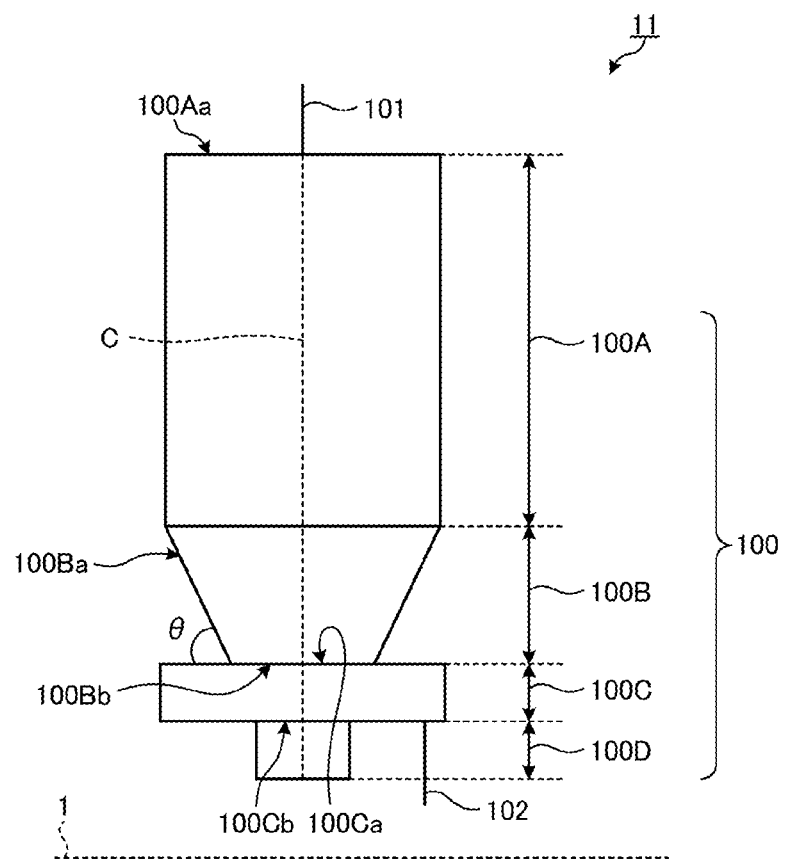

[Fig. 2]
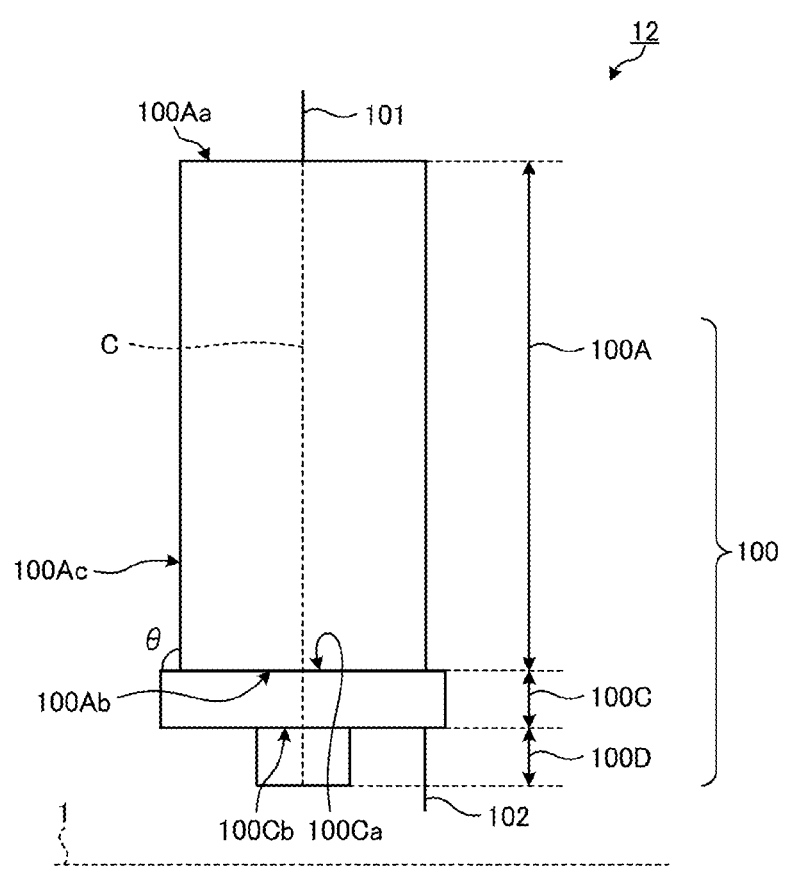

[Fig. 3]
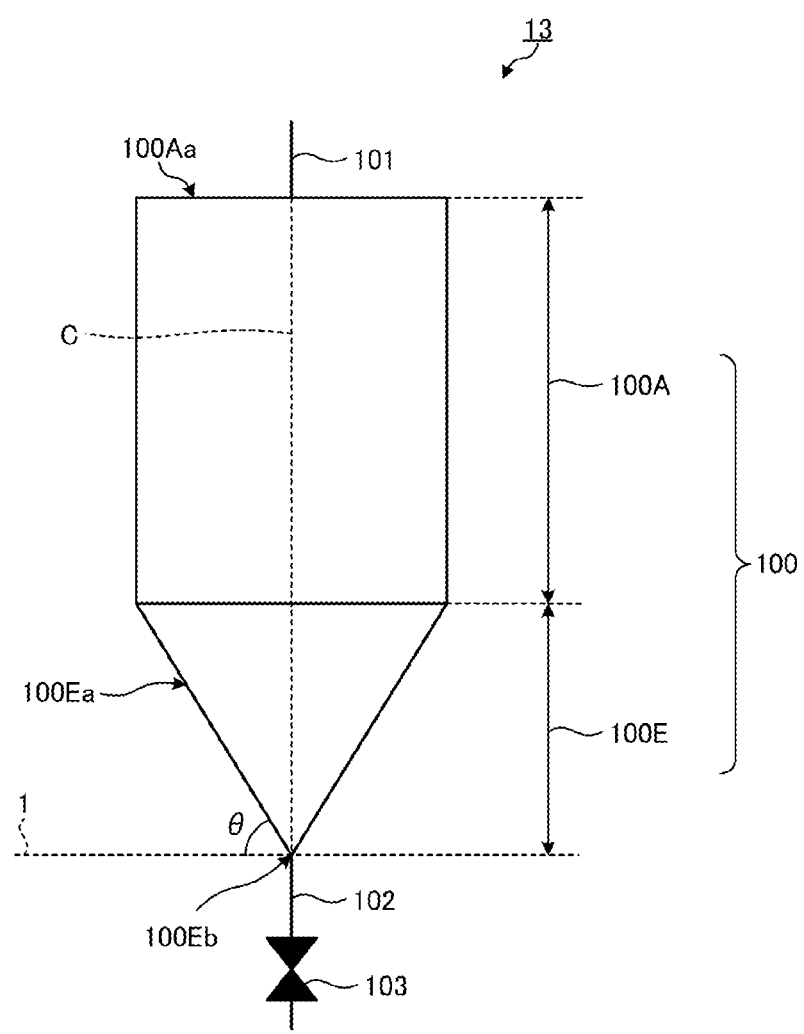

METHOD FOR DRYING POLYOLEFIN-CONTAINING PARTICLES AND METHOD FOR STORING POLYOLEFIN-CONTAINING PARTICLES

CROSS-REFERENCE TO RELATED APPLICATIONS

This application claims priority under 35 U.S.C. § 119(b) to Japanese Application No. 2021-140255, filed Aug. 30, 2021, the disclosure of which is incorporated herein by reference in its entirety.

BACKGROUND OF THE INVENTION

Field of the Invention

The present invention relates to a method for drying polyolefin-containing particles and a method for storing polyolefin-containing particles.

Description of the Related Art

A method for producing polyolefin-containing particles represented by propylene-based polymer-containing particles usually includes a step of drying (deaerating) the polyolefin-containing particles and a step of storing the polyolefin-containing particles. Specifically, for example, a method for producing a polyolefin-based polymer, the method including a step of bringing polyolefin particles into contact with a nitrogen gas in a deaerating container (drying container) to deaerate the polyolefin particles, is known (see JP-A-2015-537102).

BRIEF SUMMARY OF THE INVENTION

However, according to the conventional drying (deaerating) step, even if dried polyolefin-containing particles are discharged from a drying container, the particles unintentionally remain in the drying container, and the part of the dried particles may not be taken out of the drying container in some cases. Also in the storing step, similarly, even if the particles are discharged from a storing container, the part of the particles may not be taken out of the storing container in some cases.

As a result of intensive studies to solve the above problems, the present inventors have found that the above problems can be solved by performing a drying step so as to satisfy a predetermined requirement in drying polyolefin-containing particles and performing a storing step so as to satisfy a predetermined requirement in storing polyolefin-containing particles, and have completed the present invention.

That is, the present invention provides the following [1] to [24].

[1] A method for drying polyolefin-containing particles, comprising a drying step of supplying polyolefin-containing particles to a drying container and drying the polyolefin-containing particles in the drying container, in which in the drying step, a value determined by the following formula (a) is −0.20 or more and 1.05 or less.

$$0.00304 \times \text{apparatus diameter [m]} + 0.00261 \times \text{bed height [m]} + 0.0179 \times \text{residence time [hr]} + 0.00213 \times \text{particle temperature in drying container [K]} - 0.0109 \times \text{inclination angle [degree]} + 0.0212 \times \text{CXS component amount [\% by mass]} \quad \text{Formula (a):}$$

(In formula (a), the apparatus diameter represents a maximum diameter of a body portion of the drying container, the bed height represents a maximum height from a height of a discharge port for discharging the polyolefin-containing particles to a height at which the polyolefin-containing particles retained in the drying container are located, the residence time represents a time during which the polyolefin-containing particles are retained in the drying container, the particle temperature in the drying container represents a temperature of the polyolefin-containing particles in the drying container, the inclination angle represents an external angle formed by an inclined surface of the drying container and an installation horizontal surface of the drying container, the external angle referring to an angle on an outer side of the container, and the CXS component amount represents the content of the CXS component in the polyolefin-containing particles.)

[2] The method for drying polyolefin-containing particles according to [1], in which the polyolefin contains a propylene-based polymer.

[3] The drying method according to [2], in which the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and olefins having 4 to 12 carbon atoms is 5% by mass or more and 50% by mass or less, and the content of the CXS component in the polyolefin-containing particles is 5% by mass or more.

[4] The drying method according to [3], in which the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and olefins having 4 to 12 carbon atoms is 20% by mass or more and 50% by mass or less, and the content of the CXS component is 15% by mass or more.

[5] The drying method according to [2], in which the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and α-olefins having 4 to 12 carbon atoms is 5% by mass or more and 50% by mass or less, and the content of the CXS component in the polyolefin-containing particles is 5% by mass or more.

[6] The drying method according to [5], in which the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and α-olefins having 4 to 12 carbon atoms is 20% by mass or more and 50% by mass or less, and the content of the CXS component is 15% by mass or more.

[7] The drying method according to any one of [1] to [6], in which the temperature of the polyolefin-containing particles in the drying container is 0° C. or higher and 160° C. or lower.

[8] The drying method according to any one of [1] to [7], in which the polyolefin-containing particles in the drying container have a residence time of one hour or more and 48 hours or less.

[9] The drying method according to any one of [1] to [8], in which the inclination angle in the drying container is 30° or more.

[10] The drying method according to any one of [1] to [9], in which the polyolefin-containing particles have a median diameter of 500 μm or more and 10,000 μm or less.

[11] A method for producing polyolefin-containing particles, comprising a step of drying the polyolefin-containing particles by the drying method according to any one of [1] to [10].

[12] A method for producing a polyolefin-based resin composition, comprising a step of drying the polyolefin-containing particles by the drying method according to any one of [1] to [10].

[13] A method for storing polyolefin-containing particles, comprising a storing step of supplying polyolefin-containing particles to a storing container and storing the polyolefin-containing particles in the storing container, in which in the storing step, a value determined by the following formula (b) is −0.20 or more and 1.05 or less.

$$0.00304 \times \text{apparatus diameter [m]} + 0.00261 \times \text{bed height [m]} + 0.0179 \times \text{residence time [hr]} + 0.00213 \times \text{particle temperature in storing container [K]} − 0.0109 \times \text{inclination angle [degree]} + 0.0212 \times \text{CXS component amount [\% by mass]} \quad \text{Formula (b):}$$

(In formula (b), the apparatus diameter represents a maximum diameter of a body portion of the storing container, the bed height represents a maximum height from a height of a discharge port for discharging the polyolefin-containing particles to a height at which the polyolefin-containing particles retained in the storing container are located, the residence time represents a time during which the polyolefin-containing particles are retained in the storing container, the particle temperature in the storing container represents a temperature of the polyolefin-containing particles in the storing container, the inclination angle represents an external angle formed by an inclined surface of the storing container and an installation horizontal surface of the storing container, the external angle referring to an angle on an outer side of the container, and the CXS component amount represents the content of the CXS component in the polyolefin-containing particles.)

[14] The method for storing polyolefin-containing particles according to [13], in which the polyolefin is a propylene-based polymer.

[15] The storing method according to [14], in which the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and olefins having 4 to 12 carbon atoms is 5% by mass or more and 50% by mass or less, and the content of the CXS component in the polyolefin-containing particles is 5% by mass or more.

[16] The storing method according to [15], in which the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and olefins having 4 to 12 carbon atoms is 20% by mass or more and 50% by mass or less, and the content of the CXS component is 15% by mass or more.

[17] The storing method according to [14], in which the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and α-olefins having 4 to 12 carbon atoms is 5% by mass or more and 50% by mass or less, and the content of the CXS component in the polyolefin-containing particles is 5% by mass or more.

[18] The storing method according to [17], in which the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and α-olefins having 4 to 12 carbon atoms is 20% by mass or more and 50% by mass or less, and the content of the CXS component is 15% by mass or more.

[19] The storing method according to any one of [13] to [18], in which the temperature of the polyolefin-containing particles in the storing container is 0° C. or higher and 160° C. or lower.

[20] The storing method according to any one of [13] to [19], in which the polyolefin-containing particles in the storing container have a residence time of one hour or more and 48 hours or less.

[21] The storing method according to any one of [13] to [20], in which the inclination angle in the storing container is 30° or more.

[22] The storing method according to any one of [13] to [21], in which the polyolefin-containing particles have a median diameter of 500 μm or more and 10,000 μm or less.

[23] A method for producing polyolefin-containing particles, comprising a step of storing the polyolefin-containing particles by the storing method according to any one of [13] to [22].

[24] A method for producing a polyolefin-based resin composition, including a step of storing the polyolefin-containing particles by the storing method according to any one of [13] to [22].

By a method for drying polyolefin-containing particles according to the present invention, occurrence of clogging due to particles in a pipe for discharging dried particles from a drying container or a discharge port on the drying container side and in the vicinity thereof can be effectively suppressed, and the whole amount of the particles can be stably discharged to the outside of the drying container. Also by a storing method, the whole amount of the particles can be stably discharged to the outside of a storing container.

BRIEF DESCRIPTION OF THE DRAWINGS

The foregoing summary, as well as the following detailed description of the preferred invention, will be better understood when read in conjunction with the appended drawings:

FIG. 1 is a schematic diagram for explaining a configuration example of a first drying container;

FIG. 2 is a schematic diagram for explaining a configuration example of a second drying container; and FIG. 3 is a schematic diagram for explaining a configuration example of a third drying container.

DETAILED DESCRIPTION OF THE PREFERRED EMBODIMENTS

Hereinafter, an embodiment of the present invention will be described with reference to the drawings. Note that each of the drawings merely schematically illustrates the shapes, sizes, and arrangement of components to such an extent that the invention can be understood. The present invention is not limited by the following description, and each of the components can be modified without departing from the gist of the present invention. In the following drawings, redundant descriptions of reference numerals used for the same component may be omitted.

In the present specification, "olefin" means an aliphatic unsaturated hydrocarbon having a carbon-carbon unsaturated double bond.

In the present specification, "α-olefin" means an aliphatic unsaturated hydrocarbon having a carbon-carbon unsaturated double bond at an α-position.

In the present specification, "heterophasic propylene polymerization material" means a mixture having a structure in which a propylene copolymer containing a monomer unit derived from at least one type of α-olefin selected from the group consisting of ethylene and α-olefins having 4 to 12 carbon atoms and a monomer unit derived from propylene is dispersed in a matrix of a propylene-based polymer containing 80% by mass or more of a monomer unit (structural unit) derived from propylene (in which the total mass of the propylene-based polymer is 100% by mass).

In the present specification, "AA to BB" means AA or more and BB or less. Here, AA and BB each represent a numerical value, and AA<BB. The unit of AA is the same as the unit described immediately after BB unless otherwise specified.

In the present specification, the term "monomer unit" means a structural unit having a structure obtained by polymerizing the monomer.

In the present specification, "limiting viscosity (unit: dL/g)" is a value measured at a temperature of 135° C. using tetralin as a solvent by the following method.

Using an Ubbelohde viscometer, values of reduced viscosity are measured for a plurality of concentrations, the values of reduced viscosity are plotted with respect to the concentrations, respectively, and a limiting viscosity number is determined by an "extrapolation method" in which a concentration is extrapolated to zero. More specifically, using the method described on page 491 of "Polymer Solution, Polymer Experiment 11" (published by KYORITSU SHUPPAN CO., LTD., 1982), values of reduced viscosity are measured for three points of concentrations of 0.1 g/dL, 0.2 g/dL, and 0.5 g/dL, respectively, the values of reduced viscosity are plotted with respect to the concentrations, respectively, and a limiting viscosity number is determined by a method in which a concentration is extrapolated to zero.

In the present specification, "melt flow rate (MFR)" is a value measured in accordance with JIS K7210-1: 2014 and K7210-2: 2014 under conditions of 230° C. and a load of 2.16 kgf.

1. Method for Drying Polyolefin-Containing Particles

A method for drying polyolefin-containing particles according to the present embodiment includes a drying step of supplying polyolefin-containing particles to a drying container and drying the polyolefin-containing particles in the drying container, in which in the drying step, a value determined by the following formula (a) is −0.20 or more and 1.05 or less.

$$0.00304 \times \text{apparatus diameter [m]} + 0.00261 \times \text{bed height [m]} + 0.0179 \times \text{residence time [hr]} + 0.00213 \times \text{particle temperature in drying container [K]} - 0.0109 \times \text{inclination angle [degree]} + 0.0212 \times \text{content of CXS component [\% by mass]} \quad \text{Formula (a):}$$

(In formula (a), the apparatus diameter represents a maximum diameter of a body portion of the drying container, the bed height represents a maximum height from a height of a discharge port for discharging the polyolefin-containing particles to a height at which the polyolefin-containing particles retained in the drying container are located, the residence time represents a time during which the polyolefin-containing particles are retained in the drying container, the temperature represents a temperature of the polyolefin-containing particles in the drying container, and the inclination angle represents an external angle formed by an inclined surface of the drying container and an installation horizontal surface of the drying container. Here, the external angle means an angle not on an inner side of the drying container where the particles are present but on an outer side of the drying container. Regarding the "apparatus diameter", when the shape of the body portion is a cylindrical shape, the "maximum diameter" corresponds to an inner diameter (diameter) when the cylinder is cut in a direction orthogonal to an extending direction of the cylinder, and when the shape of the body portion is a shape other than the cylindrical shape, the "maximum diameter" corresponds to an "equivalent circle diameter" of a shape defined by an inner wall appearing when the shape is cut in a direction orthogonal to an extending direction of the shape.)

Here, the "polyolefin-containing particles" means particles containing 50% by mass or more of polyolefin, and particles containing 80% by mass or more of polyolefin are preferable, and particles containing 95% by mass or more of polyolefin are more preferable.

Hereinafter, the polyolefin that can constitute the "polyolefin-containing particles" will be described.

Polyolefin

The polyolefin is a polymer containing a structural unit (olefin unit) having a structure obtained by polymerizing an olefin.

The polyolefin may be a polymer containing only one type of olefin unit or a copolymer containing two or more types of olefin units.

The polyolefin may contain a structural unit other than the olefin unit. The content of the olefin unit that can be contained in the polyolefin is preferably 80% by mass or more, more preferably 90% by mass or more, still more preferably 95% by mass or more, and usually 100% by mass or less, and may be 100% by mass with respect to 100% by mass of the total mass of all structural units contained in the polyolefin.

The olefin that can constitute the polyolefin may be a linear olefin or a branched olefin. The olefin may be an olefin having a cyclic structure, and may be, for example, an α-olefin having a cyclic structure, such as vinylcyclopropane or vinylcyclobutane.

Specific examples of the olefin that can constitute the polyolefin include an α-olefin (such as ethylene, propylene, 1-butene, 1-pentene, 1-hexene, 4-methyl-1-pentene, 1-octene, or 1-decene).

The olefin that can constitute the polyolefin is preferably an α-olefin, more preferably ethylene, propylene, 1-butene, 1-pentene, 1-hexene, 4-methyl-1-pentene, 1-octene, or 1-decene, and still more preferably ethylene, propylene, 1-butene, 1-hexene, or 1-octene.

The polyolefin can be produced, for example, by any conventionally known suitable method using the olefins exemplified above as a raw material.

In the present embodiment, the polyolefin is preferably a propylene-based polymer containing a propylene unit. In the present embodiment, the properties of the "polyolefin-containing particles" are not particularly limited. The "polyolefin-containing particles" may be in a form of a so-called powder or in a form of pellets (particles).

Here, first, the propylene-based polymer which is a polyolefin that can constitute the "polyolefin-containing particles" will be described.

In the present embodiment, the polyolefin is a polymer in which a mass ratio of a structural unit derived from at least one type of olefin selected from the group consisting of ethylene and olefins having 4 to 12 carbon atoms is preferably 30% by mass or more, more preferably 50% by mass or more, and preferably 80% by mass or less, more preferably 95% by mass or less.

In the present embodiment, the polyolefin is a polymer in which a mass ratio of a structural unit derived from at least one type of olefin selected from the group consisting of ethylene and α-olefins having 4 to 12 carbon atoms is preferably 30% by mass or more, more preferably 50% by mass or more, and preferably 80% by mass or less, more preferably 95% by mass or less.

In the present embodiment, the polyolefin may be an ethylene-based polymer containing an ethylene unit. Here, the ethylene-based polymer is a polymer containing an ethylene unit in an amount of more than 50% by mass with respect to all structural units of the polyolefin. The ethylene unit in the ethylene-based polymer is usually 100% by mass or less. Examples of the ethylene-based polymer include an ethylene homopolymer (polyethylene) and a copolymer of ethylene and another monomer copolymerizable with ethylene, and an ethylene homopolymer is preferable. The copolymer may be a random copolymer (propylene-ethylene random polymer (RC)) or a block copolymer.

Specific examples of the polyolefin include a propylene-based polymer, an ethylene-based polymer, and a butene-based polymer. Preferred examples of the polyolefin include a propylene-based polymer. The polyolefin-containing particles may contain only one type of polyolefin or two or more types of polyolefins.

In the present embodiment, the polyolefin preferably contains a propylene-based polymer containing a propylene unit, and the content of the propylene-based polymer in the polyolefin is preferably 30% by mass or more, more preferably 60% by mass or more, and still more preferably 90% by mass or more.

(Propylene-Based Polymer)

The propylene-based polymer is a polymer containing a propylene unit in an amount of 50% by mass or more with respect to all structural units of the polymer, preferably more than 50% by mass. In the present embodiment, the content of the propylene unit in the propylene-based polymer is usually 100% by mass or less, preferably 95% by mass or less, more preferably 90% by mass or less, still more preferably 80% by mass or less, and preferably 55% by mass or more, more preferably 60% by mass or more, still more preferably 70% by mass or more.

Examples of the propylene-based polymer include a propylene homopolymer and a copolymer of propylene and another monomer copolymerizable with propylene. The copolymer may be a random copolymer or a block copolymer.

The propylene-based polymer may contain only one type of propylene-based polymer, or may contain two or more types of propylene-based polymers in an arbitrary combination.

Examples of the propylene-based polymer containing only one type of propylene-based polymer include a propylene homopolymer and a copolymer of propylene and another monomer copolymerizable with propylene (hereinafter, also referred to as a propylene-based polymer). The copolymer may be a random copolymer or a block copolymer. The random copolymer is a polymer which a monomer unit derived from at least one type of olefin selected from the group consisting of ethylene and olefins having 4 to 12 carbon atoms and a monomer unit derived from propylene are randomly connected. The block copolymer is a polymer comprising blocks in which monomer units derived from at least one type of olefin selected from the group consisting of ethylene and olefins having 4 to 12 carbon atoms are continuously linked, and blocks in which monomer units derived from propylene are continuously linked.

In the present embodiment, the propylene-based polymer is preferably a polymer in which a mass ratio of a propylene-derived structural unit is 50% by mass or more and 80% by mass or less, and a mass ratio of a structural unit derived from at least one type of olefin selected from the group consisting of ethylene and olefins having 4 to 12 carbon atoms is 20% by mass or more.

In the present embodiment, the propylene-based polymer is preferably a polymer in which a mass ratio of a propylene-derived structural unit is 50% by mass or more and 80% by mass or less, and a mass ratio of a structural unit derived from at least one type of olefin selected from the group consisting of ethylene and α-olefins having 4 to 12 carbon atoms is 20% by mass or more.

In the present embodiment, at least one type among the propylene-based polymers is preferably a heterophasic propylene polymerization material. Here, the heterophasic propylene polymerization material means a material containing two or more types of propylene-based polymers, in which the two or more types of propylene-based polymers are incompatible with each other and form different phases. Here, the heterophasic propylene polymerization material in the present embodiment will be specifically described.

(Heterophasic Propylene Polymerization Material)

The heterophasic propylene polymerization material in the present embodiment is a heterophasic propylene polymerization material containing a propylene-based polymer a and a propylene copolymer b. The propylene-based polymer a preferably contains 80% by mass or more of a monomer unit derived from propylene, and the propylene copolymer b preferably contains 20 to 70% by mass of a monomer unit derived from at least one type of α-olefin selected from the group consisting of ethylene and α-olefins having 4 to 12 carbon atoms and a monomer unit derived from propylene.

The propylene-based polymer a may be, for example, a propylene homopolymer, or may contain a monomer unit derived from a monomer other than propylene. When the propylene-based polymer a contains a monomer unit derived from a monomer other than propylene, the content thereof may be, for example, 0.01% by mass or more and less than 20% by mass based on the total mass of the propylene-based polymer a.

Examples of the monomer other than propylene include ethylene and α-olefins having 4 to 12 carbon atoms. Among these, at least one type selected from the group consisting of ethylene and α-olefins having 4 to 10 carbon atoms is preferable, at least one type selected from the group consisting of ethylene, 1-butene, 1-hexene, and 1-octene is more preferable, and at least one type selected from the group consisting of ethylene and 1-butene is still more preferable.

Examples of the propylene-based polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer.

As the propylene-based polymer a, a propylene homopolymer, a propylene-ethylene copolymer, a propylene-1-butene copolymer, or a propylene-ethylene-1-butene copolymer is preferable, and a propylene homopolymer is more preferable.

The heterophasic propylene polymerization material in the present embodiment may contain only one type of propylene-based polymer a, or may contain two or more types of propylene-based polymers a.

In the propylene copolymer b, the content of a monomer unit derived from at least one type of α-olefin selected from the group consisting of ethylene and α-olefins having 4 to 12 carbon atoms may be 20 to 70% by mass, 30 to 60% by mass, or 35 to 55% by mass.

In the propylene copolymer b, as the at least one type of α-olefin selected from the group consisting of ethylene and α-olefins having 4 to 12 carbon atoms, at least one type selected from the group consisting of ethylene and α-olefins having 4 to 10 carbon atoms is preferable, at least one type selected from the group consisting of ethylene, 1-butene, 1-hexene, 1-octene, and 1-decene is more preferable, and at least one type selected from the group consisting of ethylene and 1-butene is still more preferable.

Examples of the propylene copolymer b include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer, and a propylene-1-decene copolymer. Among these, as the propylene copolymer b, a propylene-ethylene copolymer, a propylene-1-butene copolymer, or a propylene-ethylene-1-butene copolymer is preferable, and a propylene-ethylene copolymer is more preferable.

The heterophasic propylene polymerization material in the present embodiment may contain only one type of propylene copolymer b, or may contain two or more types of propylene copolymers b.

Examples of the heterophasic propylene polymerization material in the present embodiment include a (propylene)-(propylene-ethylene) polymerization material, a (propylene)-(propylene-ethylene-1-butene) polymerization material, a (propylene)-(propylene-ethylene-1-hexene) polymerization material, a (propylene)-(propylene-ethylene-1-octene) polymerization material, a (propylene)-(propylene-1-butene) polymerization material, a (propylene)-(propylene-1-hexene) polymerization material, a (propylene)-(propylene-1-octene) polymerization material, a (propylene)-(propylene-1-decene) polymerization material, a (propylene-ethylene)-(propylene-ethylene) polymerization material, a (propylene-ethylene)-(propylene-ethylene-1-butene) polymerization material, a (propylene-ethylene)-(propylene-ethylene-1-hexene) polymerization material, a (propylene-ethylene)-(propylene-ethylene-1-octene) polymerization material, a (propylene-ethylene)-(propylene-ethylene-1-decene) polymerization material, a (propylene-ethylene)-(propylene-1-butene) polymerization material, a (propylene-ethylene)-(propylene-1-hexene) polymerization material, a (propylene-ethylene)-(propylene-1-octene) polymerization material, a (propylene-ethylene)-(propylene-1-decene) polymerization material, a (propylene-1-butene)-(propylene-ethylene) polymerization material, a (propylene-1-butene)-(propylene-ethylene-1-butene) polymerization material, a (propylene-1-butene)-(propylene-ethylene-1-hexene) polymerization material, a (propylene-1-butene)-(propylene-ethylene-1-octene) polymerization material, a (propylene-1-butene)-(propylene-ethylene-1-decene) polymerization material, (propylene-1-butene)-(propylene-1-butene) polymerization material, a (propylene-1-butene)-(propylene-1-hexene) polymerization material, a (propylene-1-butene)-(propylene-1-octene) polymerization material, a (propylene-1-butene)-(propylene-1-decene) polymerization material, a (propylene-1-hexene)-(propylene-1-hexene) polymerization material, a (propylene-1-hexene)-(propylene-1-octene) polymerization material, a (propylene-1-hexene)-(propylene-1-decene) polymerization material, a (propylene-1-octene)-(propylene-1-octene) polymerization material, and a (propylene-1-octene)-(propylene-1-decene) polymerization material. Among these, a (propylene)-(propylene-ethylene) polymerization material, a (propylene)-(propylene-ethylene-1-butene) polymerization material, a (propylene-ethylene)-(propylene-ethylene) polymerization material, a (propylene-ethylene)-(propylene-ethylene-1-butene) polymerization material, or a (propylene-1-butene)-(propylene-1-butene) polymerization material is preferable, and a (propylene)-(propylene-ethylene) polymerization material is more preferable.

Here, the above description represents "(type of propylene-based polymer containing 80% by mass or more of a monomer unit derived from propylene)-(type of propylene copolymer b)". That is, the description of "(propylene)-(propylene-ethylene) polymerization material" represents a "heterophasic propylene polymerization material in which the propylene-based polymer a is a propylene homopolymer and the propylene copolymer b is a propylene-ethylene copolymer". Hereinafter, the same applies to other similar expressions.

(Method for Producing Heterophasic Propylene Polymerization Material)

A method for producing a propylene-based polymer containing 80% by mass or more of a monomer unit derived from propylene, which can be contained in the heterophasic propylene polymerization material, preferably includes the following step 1, that is, steps 1-a and 1-b. In addition, the method for producing the heterophasic propylene polymerization material preferably includes the following steps 1 and 2.

(Step 1-a)

In step 1-a, for example, monomers containing propylene are polymerized in the presence of a polymerization catalyst and hydrogen using a liquid phase polymerization reactor. The composition of the monomers used for polymerization only needs to be appropriately adjusted based on the types and contents of monomer units constituting the propylene-based polymer a. The content of propylene in the monomers may be, for example, 80% by mass or more, 90% by mass or more, or 100% by mass with respect to the total mass of the monomers.

Examples of the liquid phase polymerization reactor include a loop type liquid phase reactor and a vessel type liquid phase reactor.

Examples of the polymerization catalyst include a Ziegler-Natta type catalyst and a metallocene-based catalyst, and the Ziegler-Natta type catalyst is preferable. Examples of the Ziegler-Natta type catalyst include a Ti-Mg-based catalyst such as a solid catalyst component obtained by bringing a titanium compound into contact with a magnesium compound, and a catalyst containing a solid catalyst component obtained by bringing a titanium compound into contact with a magnesium compound, an organoaluminum compound, and if necessary, a third component such as an electron donating compound. A catalyst containing a solid catalyst component obtained by bringing a titanium compound into contact with a magnesium compound, an organoaluminum compound, and if necessary, a third component such as an electron donating compound is preferable. A catalyst containing a solid catalyst component obtained by bringing a titanium halide compound into contact with a magnesium compound, an organoaluminum compound, and an electron donating compound is more preferable. A catalyst with which a small amount of olefin is brought into contact and which is preliminarily activated can also be used as the polymerization catalyst.

As the polymerization catalyst, a preliminary polymerization catalyst component obtained by prepolymerizing an olefin in the presence of the solid catalyst component, n-hexane, triethylaluminum, tert-butyl-n-propyldimethoxysilane, or the like can also be used. The olefin used in the preliminary polymerization is preferably any of olefins constituting the heterophasic propylene polymerization material.

A polymerization temperature can be, for example, 0 to 120° C. A polymerization pressure can be, for example, normal pressure to 10 MPaG.

(Step 1-b)

In step 1-b, for example, monomers containing propylene are polymerized in the presence of a polymerization catalyst and hydrogen using a gas phase polymerization reactor. The composition of the monomers used for polymerization can be appropriately adjusted based on the types and contents of monomer units constituting the propylene-based polymer a. The content of propylene in the monomers may be, for example, 80% by mass or more, 90% by mass or more, or 100% by mass with respect to the total mass of the monomers.

Examples of the gas phase polymerization reactor include a fluidized bed type reactor and a spouted bed type reactor.

The gas phase polymerization reactor may be a multi-stage gas phase polymerization reactor having a plurality of reaction regions connected in series. The multi-stage gas phase polymerization reactor may be a multi-stage gas phase polymerization reactor having a plurality of polymerization tanks connected in series.

The multi-stage gas phase polymerization reactor includes, for example, a cylindrical portion extending in the vertical direction, and a conical reduced diameter portion that is integrally formed with the cylindrical portion, has a smaller inner diameter as it goes vertically downward, and has a gas introduction opening at a lower end, and can have a spouted bed type olefin polymerization reaction region which is surrounded by an inner surface of the reduced diameter portion and an inner surface of the cylindrical portion above the reduced diameter portion and in which a spouted bed is formed, and a fluidized bed type olefin polymerization reaction region.

The multi-stage gas phase polymerization reactor preferably has a plurality of reaction regions in the vertical direction. The multi-stage gas phase polymerization reactor preferably has, for example, a plurality of reaction regions in the vertical direction, in which the uppermost stage is a fluidized bed type olefin polymerization reaction region and the rest is a plurality of spouted bed type olefin polymerization reaction regions from a viewpoint of optimizing the limiting viscosity of the propylene-based polymer a. In such a reactor, for example, by supplying a solid component such as a catalyst from an upper side of the reactor, and supplying a gas component from a lower side of the reactor, a fluidized bed or a spouted bed is formed in a reaction region. The gas component may contain an inert gas such as a nitrogen gas in addition to monomers containing propylene and hydrogen. In the reactor, the number of the spouted bed type olefin polymerization reaction regions is preferably 3 or more.

In the multi-stage gas phase polymerization reactor, when a plurality of reaction regions is disposed in the vertical direction, a reaction region at a lower stage may be disposed in an obliquely downward direction of a reaction region at an upper stage. In such a reactor, for example, a solid component obtained in the reaction region at the upper stage is discharged in an obliquely downward direction, and the discharged solid component is supplied to the reaction region at the lower stage from an obliquely upward direction. In this case, for example, a gas component discharged from an upper part of the reaction region at the lower stage is supplied from a lower part of the reaction region at the upper stage.

Specific examples of the polymerization catalyst that can be used in the multi-stage gas phase polymerization reactor are similar to those of the polymerization catalyst described above.

A polymerization temperature may be, for example, 0 to 120° C., 20 to 100° C., or 40 to 100° C. A polymerization pressure may be, for example, normal pressure to 10 MPaG or 1 to 5 MPaG.

(Step 2)

Step 2 can be performed in both a gas phase and a liquid phase. Step 2 is preferably performed in a gas phase. When step 2 is performed in a gas phase, for example, a gas phase reactor such as a fluidized bed type reactor or a spouted bed type reactor can be used. When step 2 is performed in a liquid phase, for example, a liquid phase reactor such as a loop type or a vessel type can be used.

In step 2, for example, using a polymerization catalyst similar to the polymerization catalyst described above, monomers containing propylene and at least one type of α-olefin selected from the group consisting of α-olefins having 4 to 12 carbon atoms can be polymerized in the presence of hydrogen. The composition of the monomers used for polymerization only needs to be appropriately adjusted based on the types and contents of monomer units constituting the propylene copolymer b. The content of at least one type of α-olefin selected from the group consisting of α-olefins having 4 to 12 carbon atoms among the monomers used for polymerization may be, for example, 20 to 70% by mass or 30 to 60% by mass.

When polymerization is performed in a liquid phase, a polymerization temperature is, for example, 40 to 100° C., and a polymerization pressure is, for example, normal pressure to 5 MPaG. When polymerization is performed in a gas phase, a polymerization temperature is, for example, 40 to 100° C., and a polymerization pressure is, for example, 0.5 to 5 MPaG.

The propylene-based polymer a and the propylene copolymer b may be prepared in steps separated from each other, the polymerization catalyst may be deactivated, and then the propylene-based polymer a and the propylene copolymer b may be mixed in a solution state, a molten state, or the like. In addition, by supplying an obtained polymer to a next step without deactivating the polymerization catalyst, the polymerization may be continuously performed. When the polymerization is continuously performed without deactivating the polymerization catalyst, the polymerization catalyst in the previous step can usually also function as a polymerization catalyst in the subsequent step.

The order of performing steps 1 and 2 is not particularly limited. Step 1 preferably includes steps 1-a and 1-b as described above. The polymerization steps 1 and steps 2 is not limited in the presence of hydrogen, in which the polymerization steps 1 and steps 2 may be performed in absence of hydrogen.

The method for producing a heterophasic propylene polymerization material according to the present embodiment preferably includes steps 1-a, 1-b, and 2 in this order.

(Solid-Gas Separation Step and Catalyst Deactivation Step)

The propylene-based polymer (heterophasic propylene polymerization material) obtained by the above steps is subjected to a solid-gas separation step and a catalyst deactivation step. Specifically, by transferring the reaction mixture containing the propylene-based polymer from the polymerization reactor to a solid-gas separation container having any conventionally known suitable configuration, and for example, supplying water vapor (steam) and a nitrogen gas from a bottom side of the solid-gas separation container, the catalyst deactivation step of deactivating a solid catalyst component can be performed together with the solid-gas separation step.

Polyolefin-Containing Particles

In the present embodiment, the polyolefin-containing particles may further contain, in addition to the one or more types of polyolefins described above, any conventionally known suitable additive such as a heat stabilizer, an ultraviolet stabilizer, an antioxidant, a crystal nucleating agent, a lubricant, a colorant, an antiblocking agent, an antistatic agent, an antifogging agent, a flame retardant, a petroleum resin, a foaming agent, a foaming aid, an organic filler, or an inorganic filler as necessary. In other words, the polyolefin-containing particles according to the present embodiment may be particles of a polyolefin-based resin composition.

The addition amount of the additive is preferably 0.01% by mass or more and 30% by mass or less with respect to the whole amount (100% by mass) of the polyolefin-containing particles (propylene-based polymer-containing particles). One type of additive may be used singly, or two or more types of additives may be used in combination.

In the present embodiment, the content of the CXS component in the polyolefin-containing particles (propylene-based polymer-containing particles) is preferably 5% by mass or more, more preferably 10% by mass or more, and still more preferably 15% by mass or more, is preferably 80% by mass or less and more preferably 60% by mass or less, and is preferably 5% by mass or more and 80% by mass or less and more preferably 10% by mass or more and 60% by mass or less.

Here, the CXS (cold xylene soluble part) component means a component soluble in xylene.

More specifically, the CXS component refers to a residual component obtained by separating a CXIS component from a measurement target. Note that the CXIS (cold xylene insoluble part) component means a component insoluble in xylene, and more specifically refers to a component that is insoluble particularly in p-xylene among components contained in a measurement target (polyolefin, polyolefin-containing particles), and can be obtained by, for example, the following separation method.

(Separation Method)

About 2 g of a measurement target (polyolefin, polyolefin-containing particles) is dissolved in boiled p-xylene for two hours to obtain a solution. Subsequently, the obtained solution is cooled to 20° C., and a solid precipitated in the cooled solution is defined as a CXIS component.

Method for Drying Polyolefin-Containing Particles

A method for drying polyolefin-containing particles (also simply referred to as "particles") according to the present embodiment includes a drying step of supplying polyolefin-containing particles to a drying container, supplying a drying gas to the drying container, and drying the polyolefin-containing particles in the drying container. A specific configuration example of the drying container will be described later.

(Granulation Step)

A granulation step in the present embodiment can be performed using any conventionally known suitable granulator.

The particles in the present embodiment can be produced by, for example, melt-kneading the polyolefin and the additive described above as raw material components. A temperature at the time of melt kneading may be 180° C. or higher, 180 to 300° C., or 180 to 250° C.

Examples of the granulator suitably used in the present embodiment include a Banbury mixer, a single screw extruder, a twin screw co-rotating extruder, and a twin screw counter-rotating extruder.

(Drying Step)

After the granulation step is performed, a step of drying the particles granulated by the granulation step is performed using a drying container. A specific configuration of the drying container will be described later.

In the following description, a configuration example in which a body portion of the drying container is a cylindrical portion will be described, but the present invention is not limited thereto. The shape and the like of the drying container, particularly the shape and the like of the body portion can be any suitable shape and the like according to design, such as a rectangular parallelepiped outer shape, as log as the effects of the present invention are not impaired.

In the drying step in the present embodiment, the temperature of the particles supplied into the drying container (a temperature of the particles when the particles are put into the drying container) is preferably 25° C. or higher and 160° C. or lower. The temperature of the particles supplied into the drying container is more preferably 50° C. or higher and 100° C. or lower.

In the present embodiment, as the drying gas supplied to the drying container, any conventionally known suitable gas can be used. As the drying gas, an inert gas such as a nitrogen gas is preferably used.

In the present embodiment, "superficial velocity (m/s)" of the drying gas means a velocity that can be calculated by dividing a total flow rate ($m^3/s$) of the drying gas supplied to the drying container by the area ($m^2$) of a cross section (circular shape in a case of the cylindrical portion) extending in a direction orthogonal to an extending direction (vertical direction) of the body portion (cylindrical portion) of the drying container in a flowing direction of the drying gas. Note that when the cross section extending in the direction orthogonal to the extending direction (vertical direction) of the body portion of the drying container in the flowing direction of the drying gas changes depending on the height of the body portion in the extending direction, the area (m$^2$) of the cross section is a value obtained by dividing the volume of the drying container by the height of the drying container in the extending direction.

In the drying step in the present embodiment, a value determined by the following formula (a) is −0.20 or more and 1.05 or less, and a lower limit of the value is preferably −0.15 or more, and more preferably 0 or more. An upper limit of the value is preferably 0.95 or less, and more preferably 0.85 or less.

$$0.00304 \times \text{apparatus diameter [m]} + 0.00261 \times \text{bed height [m]} + 0.0179 \times \text{residence time [hr]} + 0.00213 \times \text{particle temperature in drying container [K]} - 0.0109 \times \text{inclination angle [degree]} + 0.0212 \times \text{content of CXS component [\% by mass]} \quad \text{Formula (a):}$$

When the value determined by formula (a) is −0.20 or more and 1.05 or less, a rat hole or the like is not generated in the container, the particles can be prevented from remaining in the container, and the whole amount of the dried particles can be stably discharged to the outside of the drying container. In a case where there is a downstream step, when the particles are transferred in a transfer pipe, the particles do not block the transfer pipe, and the particles can be stably transferred to the downstream step. As a result, a polyolefin resin composition can be stably produced.

Here, the "rat hole" means a cylindrical hole defined by the particles remaining in the drying container because only particles located almost immediately above a discharge port are discharged when the particles in the drying container are discharged to the outside of the drying container.

In formula (a), the apparatus diameter more specifically represents a maximum diameter of an inner diameter when the cylindrical portion, which is the body portion in which the particles are housed, is cut along a plane orthogonal to the extending direction in the drying container.

In the present embodiment, the apparatus diameter is, for example, preferably 0.1 m to 10.0 m, and more preferably 0.6 m to 7.0 m.

In formula (a), the bed height more specifically represents a maximum height at which the polyolefin-containing particles retained in the drying container are located, and represents a distance from a lowermost end of the drying container, that is, usually, the height of a discharge port for discharging the particles to a substantially flat surface constituted by the presence of the polyolefin-containing particles retained in the drying container (a specific aspect will be described later with reference to the drawings).

In the present embodiment, the bed height is, for example, preferably 0.10 m to 40.00 m, and more preferably 0.72 m to 25.00 m.

In formula (a), the residence time represents a time during which the polyolefin-containing particles are retained in the drying container in the drying step.

Specifically, when the drying step is a batch method drying step, the residence time means total time during which the particles are supplied into the drying container, the supply of the particles is completed, supply of a drying gas into the drying container is started, and discharge of the dried particles to the outside of the drying container is started. When the drying step is a continuous drying step, the residence time means a value calculated by dividing an average value [kg] of the residence amount of the particles in the drying container during the continuous drying step by an average value of a discharge rate [kg/hr] of the particles discharged from the drying container during the continuous drying step. Note that "during the continuous drying step" means a period from a start time point to an end time point, in which the start time point is a time point at which a drying gas is supplied into a drying container in a state where a predetermined amount of particles are present in the drying container, the particles are supplied into the drying container, and the dried particles are discharged to the outside of the drying container, and the end time point is a time point at which the supply of the particles into the drying container and the discharge of the particles to the outside of the drying container are stopped.

In the present embodiment, the residence time is preferably one hour or more and 48 hours or less, and a lower limit of the value is more preferably two hours or more, and still more preferably four hours or more. An upper limit of the value is preferably 23 hours or less, and more preferably 19 hours or less.

In formula (a), the particle temperature in the container represents the temperature of the particles in the drying container. In the present embodiment, the temperature of the particles in the drying container in the drying step is, for example, preferably 273 K (0° C.) to 433 K (160° C.), and a lower limit of the value is more preferably 298 K (25° C.) or higher, and still more preferably 333 K (60° C.) or higher. An upper limit of the value is more preferably 413 K (140° C.) or lower, and still more preferably 373 K (110° C.) or lower.

Here, regarding the particle temperature in the container, when the drying step is a batch method drying step, the particle temperature in the container means an average particle temperature in the drying container from the completion of supplying the particles into the drying container to the start of discharging the particles to the outside of the drying container. When the drying step is a continuous drying step, the particle temperature in the drying container means an average temperature of the particles present in the drying container during a continuous drying period in which the particles are continuously supplied into the drying container and continuously discharged to the outside of the drying container. Note that the particle temperature can be measured by measuring a temperature of a particle-filled portion in the drying container, and when the temperatures at a plurality of places are measured, an average value of the temperatures can be adopted as the particle temperature.

In formula (a), the inclination angle represents an external angle formed by an inclined surface of the drying container and an installation surface which is a horizontal plane, that is, when the drying container is installed such that an extending direction of the cylindrical portion of the drying container coincides with the vertical direction. Note that the external angle means an angle not on an inner side of the drying container where the particles are present but on an outer side of the drying container.

In the present embodiment, the inclination angle is usually larger than 0° and smaller than 180°. Note that the inclination angle is preferably 30° or more, more preferably 45° or more, and still more preferably 55° or more. The inclination angle is preferably 120° or less, and more preferably 90° or less.

In the present embodiment, a particle discharger may be installed downstream of the drying container. The discharger is not particularly limited. Examples of the discharger include a ball valve, a rotary valve, and a circle feeder.

Median Diameter of Particles

A median diameter of the particles in the present embodiment is preferably 500 μm or more and 10,000 μm or less, more preferably 1500 μm or more and 7500 μm or less, and still more preferably 3000 μm or more and 5000 μm or less.

In the present embodiment, the median diameter of the particles can be measured by a laser diffraction type particle diameter distribution measuring method or a sieve shaking type particle diameter distribution measuring method. These will be described below.

(Laser Diffraction Type Particle Diameter Distribution Measuring Method)

In the present embodiment, the median diameter of the particles can be measured using, for example, a laser diffraction type particle diameter distribution measuring device (for example, HELOS/KF, sample disperser: GRADIS+ VIBRI, manufactured by Sympatec GmbH).

Specifically, the volume-based median diameter ($D_{50}$) can be calculated by putting about 1 to 10 g of a sample of particles into a particle diameter distribution measuring device, measuring a particle diameter distribution, and analyzing the particle diameter distribution with analysis software (for example, WINDOX ver 5.3.1.0). The measurement may be further repeated three to five times for the sample, and an average value of the measured values may be taken as the average median diameter.

(Sieve Shaking Type Particle Diameter Distribution Measuring Method)

In the present embodiment, when the average median diameter of the particles is measured, the average median diameter may be calculated by measuring a particle diameter distribution by sieving in which the particles are sieved based on the particle diameter using gravity from a net stretched at a bottom of the sieve by shaking the sieve.

Specifically, the method is as follows.

First, sieves having different openings are stacked in several stages such that the sieves are stacked in descending order of the size of the opening from the top.

Subsequently, a sample is put into the uppermost sieve, then an operation of shaking all the sieves for five minutes is performed four times with a shaking width of 1.0 mm, and sieving can be thereby performed.

As the sieve, for example, a sieve having an opening of 5600 μm, 4750 μm, 4000 μm, 3350 μm, 2360 μm, 2000 μm, 1700 μm, 1400 μm, 1180 μm, 1000 μm, 850 μm, 710 μm, 500 μm, 300 μm, or 150 μm (JIS Z 8801, manufactured by Manabe Kogyo Co., Ltd.) can be used.

The sample amount only needs to be, for example, 100 g or more. As a sieve shaker, an electromagnetic sieve shaker AS200 manufactured by Retsch GmbH can be used.

The measurement can be performed by weighing the sample remaining on each sieve.

Specifically, the method is as follows.

The amount of the sample remaining on each sieve after shaking is weighed. Note that the amount of the sample remaining on each sieve is summed up in descending order of the size of the opening. Here, a sieve having a total value exceeding 50% of the total amount of the sample put into the sieve is defined as a sieve b. A sieve just above the sieve b is defined as a sieve a.

The average median diameter ($D_{50}$) can be calculated by the following formula based on the above measurement.

$$D_{50}=Da-[(Da-Db)\times\{(xb-50)/(xb-xa)\}]$$

If more than 50% of the total amount of sample put into the sieve does not remain in any of the sieves, the sieve with the largest amount of remaining sample is defined as sieve b, and a sieve just above the sieve b is defined as a sieve a.

In the above formula, Da represents an opening [μm] of the sieve a, Db represents an opening [μm] of the sieve b, xa represents a ratio [%] of the amount of the sample remaining on the sieve a with respect to the sample amount (total amount), a sum of accumulation ratios [%] in the sieves above the sieve a, and xb represents a ratio [%] of the amount of the sample remaining on the sieve b with respect to the sample amount (total amount), a sum of accumulation ratios [%] in the sieves above the sieve b.

2. Method for Storing Polyolefin-Containing Particles

A method for storing polyolefin-containing particles according to the present embodiment includes a storing step of supplying polyolefin-containing particles to a storing container and storing the polyolefin-containing particles in the storing container, in which in the storing step, a value determined by the following formula (b) is −0.20 or more and 1.05 or less.

$$0.00304\times\text{apparatus diameter [m]}+0.00261\times\text{bed height [m]}+0.0179\times\text{residence time [hr]}+0.00213\times\text{particle temperature in storing container [K]}-0.0109\times\text{inclination angle [degree]}+0.0212\times\text{CXS component amount [\% by mass]}\quad\text{Formula (b):}$$

(In formula (b), the apparatus diameter represents a maximum diameter of a body portion of the storing container, the bed height represents a maximum height from a height of a discharge port for discharging the polyolefin-containing particles to a height at which the polyolefin-containing particles retained in the storing container are located, the residence time represents a time during which the polyolefin-containing particles are retained in the storing container, the particle temperature in the storing container represents a temperature of the polyolefin-containing particles in the storing container, the inclination angle represents an external angle formed by an inclined surface of the storing container and an installation horizontal surface of the drying container, the external angle referring to an angle on an outer side of the container, and the CXS component amount represents the content of the CXS component in the polyolefin-containing particles.)

Here, the external angle means an angle not on an inner side of the storing container where the particles are present but on an outer side of the storing container. Regarding the "apparatus diameter", when the shape of the body portion is a cylindrical shape, the "maximum diameter" corresponds to an inner diameter (diameter) when the cylinder is cut in a direction orthogonal to an extending direction of the cylinder, and when the shape of the body portion is a shape other than the cylindrical shape, the "maximum diameter" corresponds to an "equivalent circle diameter" according to a shape defined by an inner wall appearing when the shape is cut in a direction orthogonal to an extending direction of the shape.

In the method for storing polyolefin-containing particles according to the present embodiment, the "polyolefin-containing particles" are similar to the "polyolefin-containing particles" in the above "method for drying polyolefin-containing particles".

The method for storing polyolefin-containing particles according to the present embodiment includes a storing step of supplying polyolefin-containing particles to a storing container and storing the polyolefin-containing particles in the storing container. The configuration of the storing container is similar to that of the drying container in the drying step.

A granulation step in the storing method of the present embodiment can be performed using any conventionally known suitable granulator. The granulation step (granulation conditions) and a granulator used in the granulation step are similar to those in the above method for drying polyolefin-containing particles.

After the granulation step is performed, a step of storing particles granulated by the granulation step is performed using the storing container. The configuration of the storing container is similar to the configuration of a drying container described later.

In the storing step of the present embodiment, a value determined by the following formula (b) is −0.20 or more and 1.05 or less, and a lower limit of the value is preferably −0.15 or more, and more preferably 0 or more. An upper limit of the value is preferably 0.95 or less, and more preferably 0.85 or less.

0.00304×apparatus diameter [m]+0.00261×bed height [m]+0.0179×residence time [hr]+ 0.00213×particle temperature in storing container [K]−0.0109×inclination angle [degree]+ 0.0212×content of CXS component [% by mass]      Formula (b):

Note that the storing step in the present embodiment is performed by a so-called "batch method". That is, the storing step in the present embodiment can be performed in a similar manner to the batch drying step in the drying step in the drying method described above. Here, in the storing step in the present embodiment, the particles are not necessarily dried. In other words, in the storing step, a volatile component and the like contained in the particles may be removed, or do not have to be removed.

When the value determined by formula (b) is −0.20 or more and 1.05 or less, a rat hole or the like is not generated in the container, the particles can be prevented from remaining in the container, and the whole amount of the stored particles can be stably discharged to the outside of the storing container. In a case where there is a downstream step, when the particles are transferred in a transfer pipe, the particles do not block the transfer pipe, and the particles can be stably transferred to the downstream step. As a result, a polyolefin resin composition can be stably produced.

In the present embodiment, the drying method and the storing method described above can be performed in combination. That is, in the present embodiment, for example, after the drying method described above is performed, the storing method described above may be further performed. Note that, in the present embodiment, polyolefin-containing particles produced by performing only the drying method described above can be used as a finished product, and polyolefin-containing particles produced by performing only the storing method (under a condition that volatile components and the like contained in the particles can be removed) without performing the drying method can also be used as a finished product.

EXAMPLES

Hereinafter, the present invention will be described more specifically with reference to Examples. The present invention is not limited to the following Examples.

Measurement and evaluation methods in Examples and Comparative Examples are described below.

[Content of Ethylene Unit (Unit: % by Mass)]

The content of an ethylene unit in a polymer was determined by an IR spectrum method in accordance with IR spectrum measurement described on page 619 of Polymer Handbook (published by KINOKUNIYA COMPANY LTD., 1995). Here, the "ethylene unit" means a structural unit derived from ethylene which is a monomer.

The content of an ethylene unit in an propylene-ethylene copolymer was determined by dividing the content of a structural unit derived from ethylene in a heterophasic propylene polymerization material (referred to as the content of an ethylene unit) by a mass ratio of the propylene-ethylene copolymer in the heterophasic propylene polymerization material.

[Xylene Soluble Part Amount (Unit: % by Mass) at 20° C.]

A xylene soluble part amount (CXS component amount, unit: % by mass) in polyolefin-containing particles at 20° C. was determined as follows. That is, 200 mL of xylene was added to 1 g of the polyolefin-containing particles, the mixture was boiled to completely dissolve the polyolefin therein, then the mixture was cooled, and a state of the mixture was adjusted at 20° C. for one hour or more. Thereafter, the mixture was separated into a soluble part and an insoluble part using filter paper. For the soluble part, a solvent was removed from the filtrate, the residue was dried to obtain a sample, and the weight of the sample was measured, thus determining the CXS component amount.

[Mooney Viscosity (Unit: ML(1+4)125° C.)]

Mooney viscosity was measured at a temperature of 125° C. in accordance with JIS K 6300.

[Diene Content (Unit: % by Mass)]

The content of diene was measured by FT-IR.

[Propylene Content (Unit: % by Mass)]

In Table 1, a propylene content in EPDM is a value obtained by subtracting an ethylene content and a diene content from 100% by mass, and a propylene content in each of HP1, HP2, and RC is a value obtained by subtracting an ethylene content from 100% by mass. Note that the meanings of the abbreviations will be described later.

Example 1

Production of Particles A

A granulation step of granulating the raw material components presented in Table 1 below at the mixing ratio presented in Table 2 below under the conditions presented in Table 3 below using an extruder (TEX 90α) manufactured by The Japan Steel Works, Ltd. was performed to obtain particles A containing a propylene-based polymer which is a polyolefin. The physical properties of the particles A are presented in Table 4 below.

TABLE 1

| Raw material component | Unit | EPDM *1 | HP1 *2 | HP2 *2 | RC *3 |
|---|---|---|---|---|---|
| Mooney viscosity (125° C.) | [ML(1 + 4) 125° C.] | 46 | — | — | — |
| MFR | [g/10 min] | — | 30 | 55 | 28 |
| EP *4 content | [% by mass] | — | 16 | 21 | — |
| Propylene content | [% by mass] | 35.2 | 93.0 | 93.0 | 96.0 |

TABLE 1-continued

| Raw material component | Unit | EPDM *1 | HP1 *2 | HP2 *2 | RC *3 |
|---|---|---|---|---|---|
| Ethylene content | [% by mass] | 64.6 | 7.0 | 7.0 | 4.0 |
| Diene content | [% by mass] | 0.2 | — | — | — |

*1: EPDM = ethylene-propylene-diene copolymer
*2: HP = heterophasic propylene polymerization material
*3: RC = propylene-ethylene random copolymer
*4: EP = ethylene-propylene copolymer

TABLE 2

| Raw material component | Ratio (% by mass) |
|---|---|
| EPDM | 45.7 |
| HP1 | 35 |
| HP2 | 10 |
| RC | 9 |
| Additive masterbatch 1 *1 | 1.25 |
| Additive masterbatch 2 *2 | 0.3 |

*1: Masterbatch of antioxidant, weather-resistant agent, lubricant, and neutralizing agent
*2: Nucleating agent

TABLE 3

| | Unit | |
|---|---|---|
| Extruder | [–] | TEX 90α manufactured by The Japan Steel Works, Ltd. |
| Number of vents | [Number] | 2 (atmospheric vent), 1 (vacuum vent) |
| Rotation speed | [rpm] | 220 |
| Outlet temperature of extruder | [° C.] | 220 to 230 |

<Step of Drying Particles A>

Using a first drying container 11 illustrated in FIG. 1, a drying step was performed in which heated air was supplied from a bottom side of the first drying container to dry the particles A by a batch method under the conditions presented in Table 4 below.

Here, a configuration example of the first drying container 11 will be described with reference to FIG. 1. FIG. 1 is a schematic diagram for explaining a configuration example of the first drying container.

As illustrated in FIG. 1, the first drying container 11 includes a hollow drying container 100 including a body portion 100A which is a cylindrical portion in this configuration example, a truncated cone portion 100B which is integrally connected to the body portion 100A and has an inclined surface 100Ba, and a circle feeder 100C connected to the truncated cone portion 100B (a protruding motor portion 100D is also included in the circle feeder). The drying container 100 can be made of any conventionally known suitable material.

In use, the drying container 100 is disposed such that a top surface 100Bb of the truncated cone portion 100B having a smaller area is a lower end portion in the vertical direction, and an end portion of the body portion 100A on a side opposite to a side where the truncated cone portion 100B is connected is an upper end portion 100Aa. More specifically, the drying container 100 is installed such that a central axis C passing through the center of the top surface 100Bb of the truncated cone portion 100B and the center of the upper end portion 100Aa of the body portion 100A is orthogonal to an installation surface 1 which is a horizontal plane.

To the upper end portion 100Aa of the body portion 100A of the drying container 100, a supply line 101 is connected. The supply line 101 is configured to introduce a drying target such as particles containing a propylene-based polymer which is a polyolefin into the drying container 100.

On the top surface 100Bb of the truncated cone portion 100B of the drying container 100, the circle feeder 100C having a cylindrical shape is disposed such that an upper surface 100Ca of the circle feeder 100C is connected to the top surface 100Bb of the truncated cone portion 100B.

Here, an angle θ formed by the inclined surface 100Ba of the truncated cone portion 100B, which is a part of a side wall of the drying container 100, and the upper surface 100Ca of the circle feeder 100C, that is, an angle θ (referred to as an inclination angle) formed by the inclined surface 100Ba of the truncated cone portion 100B and the installation surface 1 which is a horizontal plane is 70° in Example 1.

The motor portion 100D protrudes from a lower surface 100Cb of the circle feeder 100C. A discharge line 102 is connected to a region of the lower surface 100Cb of the circle feeder 100C, deviated from the central axis C and the motor portion 100D. The discharge line 102 is connected to a discharge port and is configured to discharge a drying target that has been subjected to a drying treatment to the outside of the circle feeder 100C, that is, the outside of the drying container 100.

Note that, in the first drying container 11, a lowermost end serving as a reference for calculating the "bed height" is the top surface 100Bb which is a lower end of the truncated cone portion 100B. When a discharger such as the circle feeder 100C is disposed, the diameter of the discharge port corresponds to the diameter of an opening on a side of the first drying container 11 to which the discharger is connected.

The supply line 101 and the discharge line 102 can each have any conventionally known suitable configuration including a pipe, a valve, and the like. In addition, the supply line 101 and the discharge line 102 can be each configured so as to have any suitable arrangement, shape, and size according to a desired aspect. The circle feeder 100C (and the motor portion 100D) can also have any conventionally known suitable configuration.

After the drying step was performed, the circle feeder 100C (manufactured by Yoshikawa Co., Ltd.) was started, and the particles A were discharged from the first drying container 11. As a result, the whole amount of the particles A could be stably discharged.

Examples 2 and 3 and Comparative Examples 1 and 2

Examples 2 and 3 and Comparative Examples 1 and 2 were performed in a similar manner to Example 1 except that the conditions of the drying step were as illustrated in Table 4 below. Results thereof are presented in Table 4 below.

Here, a configuration example of a second drying container 12 will be described with reference to FIG. 2. FIG. 2 is a schematic diagram for explaining a configuration example of the second drying container.

As illustrated in FIG. 2, the second drying container 12 includes a hollow drying container 100 including a cylindrical portion 100A and a circle feeder 100C connected to the cylindrical portion 100A (a protruding motor portion 100D is also included in the circle feeder). The drying container 100 can be made of any conventionally known suitable material.

In use, the drying container 100 is installed such that a central axis C passing through the centers of an upper end portion 100Aa and a lower end portion 100Ab of the cylindrical portion 100A and the centers of an upper surface 100Ca and a lower surface 100Cb of the circle feeder 100C is orthogonal to an installation surface 1 which is a horizontal plane. Note that the upper end portion 100Aa and the lower end portion 100Ab of the cylindrical portion 100A, and the upper surface 100Ca and the lower surface 100Cb of the circle feeder 100C are all disposed so as to be parallel to the installation horizontal surface 1.

To the upper end portion 100Aa of the cylindrical portion 100A of the drying container 100, a supply line 101 is connected. The supply line 101 is configured to introduce a drying target such as particles containing a propylene-based polymer which is a polyolefin into the drying container 100.

On the lower end portion 100Ab of the cylindrical portion 100A of the drying container 100, the circle feeder 100C having a cylindrical shape is disposed such that an upper surface 100Ca of the circle feeder 100C is connected to the lower end portion 100Ab.

Here, an angle θ formed by a side wall 100Ac of the cylindrical portion 100A (drying container 100) and the upper surface 100Ca of the circle feeder 100C, that is, an angle θ formed by the side wall 100Ac and the installation surface 1 which is a horizontal plane is 90° in Examples 2 and 3 and Comparative Examples 1 and 2. Note that even when the angle formed is 90° as in the present aspect, "θ" is referred to as an "inclination angle" in the present specification. Therefore, in the second drying container 12, the inclination angle θ is 90°.

A motor portion 100D which is a part of the circle feeder protrudes from a lower surface 100Cb of the circle feeder 100C. A discharge line 102 is connected to a discharge port located in a region of the lower surface 100Cb of the circle feeder 100C, deviated from the central axis C and the motor portion 100D. The discharge line 102 is configured to discharge a drying target that has been subjected to a drying treatment to the outside of the circle feeder 100C, that is, the outside of the drying container 100.

Note that, in the second drying container 12, a lowermost end serving as a reference for calculating the "bed height" is the lower end portion 100Ab of the cylindrical portion 100A. When a discharger such as the circle feeder 100C is disposed in this way, a connecting portion between the discharger and the drying container is the lowermost end. In addition, when a discharger such as the circle feeder 100C is disposed, the diameter of the discharge port corresponds to the diameter of an opening on a side of the second drying container 12 to which the discharger is connected.

The supply line 101 and the discharge line 102 can each have any conventionally known suitable configuration including a pipe, a valve, and the like. In addition, the supply line 101 and the discharge line 102 can be each configured so as to have any suitable arrangement, shape, and size according to a desired aspect. The circle feeder 100C can also have any conventionally known suitable configuration.

Example 4

Production of Particles B

<Production of Solid Catalyst Component>

An atmosphere in a 100 mL flask equipped with a stirrer, a dropping funnel, and a thermometer was replaced with a nitrogen gas, and then 36.0 mL of toluene and 22.5 mL of titanium tetrachloride were put into the flask and stirred to obtain a titanium tetrachloride solution.

Subsequently, the temperature of the atmosphere in the flask was set to 0° C., and then 1.88 g of magnesium diethoxide was put into the flask four times at intervals of 30 minutes at 0° C. Thereafter, the mixture was stirred at 0° C. for 1.5 hours.

Next, 0.60 mL of ethyl 2-ethoxymethyl-3,3-dimethylbutanoate was put into the flask, and then the temperature in the flask was raised to 10° C.

Thereafter, the mixture was stirred at 10° C. for two hours, and 9.8 mL of toluene was further put into the flask. Subsequently, the temperature in the flask was raised, and 3.15 mL of ethyl 2-ethoxymethyl-3,3-dimethylbutanoate was put into the flask when the temperature reached 60° C., and the temperature was raised to 110° C. Next, the mixture in the flask was stirred at 110° C. for three hours.

The mixture obtained by stirring as described above was subjected to solid-liquid separation to obtain a solid. The obtained solid was washed three times with 56.3 mL of toluene at 100° C.

38.3 mL of toluene was further added to the washed solid to form a slurry. To the obtained slurry, 15.0 mL of titanium tetrachloride and 0.75 mL of ethyl 2-ethoxymethyl-3,3-dimethylbutanoate were added to form a mixture, and then the mixture was stirred at 110° C. for one hour. The obtained mixture was subjected to solid-liquid separation. The obtained solid was washed three times with 56.3 mL of toluene at 60° C., and further washed three times with 56.3 mL of hexane at normal temperature. The washed solid was dried under reduced pressure to obtain a solid catalyst component.

The obtained solid catalyst component had a titanium atom content of 2.53% by mass, an ethoxy group content of 0.44% by mass, and an internal electron donor content of 13.7% by mass.

The obtained solid catalyst component had a center particle diameter of 59.5 μm as measured by a laser diffraction/scattering method, and a cumulative percentage of the component in which a particle diameter was 10 μm or less in a volume-based particle diameter distribution was 5.3%.

The amount of a peak component of the obtained solid catalyst component derived from an oxygen atom is orbital as measured by XPS analysis and having a peak position in a binding energy range of 532 to 534 eV was 85.0%, and the amount of a peak component of the obtained solid catalyst component derived from an oxygen atom is orbital as measured by XPS analysis and having a peak position in a binding energy range of 529 to 532 eV was 15.0%.

The total pore volume of the obtained solid catalyst component as measured by a mercury intrusion method was 1.43 mL/g, the total volume of pores having a pore radius of 5 to 30 nm was 0.160 mL/g, the total volume of pores having a pore radius of 30 to 700 nm was 0.317 mL/g, and a specific surface area was 107.44 m$^2$/g.

(Production of Heterophasic Propylene Polymerization Material)

<Preliminary Polymerization Step>

Into a stainless steel (SUS) autoclave having an internal volume of 3 L and equipped with a stirrer, 1.7 L of sufficiently dehydrated and deaerated n-hexane, 34 mmol of triethylaluminum (TEA), and 3.4 mmol of tert-butyl-n-propyldimethoxysilane were put.

Into the autoclave, 12 g of the solid catalyst component produced as described above was added, and then a preliminary polymerization step of continuously supplying 12 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor, a multi-stage gas phase polymerization reactor, and two gas phase polymerization reactors were disposed in series and connected to each other was used.

The main polymerization step was performed by polymerization steps 1-a, 1-b, 2-a, and 2-b. Specifically, the main polymerization step was performed by producing a propylene-based polymer a which is a propylene homopolymer in the polymerization steps 1-a and 1-b, transferring the produced propylene-based polymer a and a solid catalyst component to a polymerization reactor in the next stage without deactivating the produced propylene-based polymer a and the solid catalyst component, and producing a propylene copolymer b which is an propylene-ethylene copolymer by polymerization in the polymerization steps 2-a and 2-b. Hereinafter, the polymerization steps 1-a, 1-b, 2-a, and 2-b will be specifically described.

(Polymerization Step 1-a) (Homopolymerization of Propylene Using Slurry Polymerization Reactor)

Homopolymerization of propylene was performed using a vessel type slurry polymerization reactor made of SUS 304 and equipped with a stirrer.

Specifically, the slurry of propylene, hydrogen, TEA, tert-butyl-n-propyldimethoxysilane, and the above-described preliminary polymerization catalyst component obtained in the preliminary polymerization step was continuously supplied to a slurry polymerization reactor to perform a polymerization reaction. Reaction conditions were as follows.

Polymerization temperature: 50° C.
Stirring speed: 150 rpm
Liquid level in slurry polymerization reactor: 18 L
Supply amount of propylene: 20 kg/hour
Supply amount of hydrogen: 28.6 NL/hour
Supply amount of TEA: 39.0 mmol/hour
Supply amount of tert-butyl-n-propyldimethoxysilane: 7.60 mmol/hour
Supply amount of slurry (in terms of solid catalyst component): 0.45 g/hour
Polymerization pressure: 3.77 MPa (gauge pressure)

A product (propylene homopolymer) sampled from an outlet of the slurry polymerization reactor had a limiting viscosity [η]L1 of 1.23 dL/g.

(Polymerization Step 1-b) (Homopolymerization (Gas Phase Polymerization) of Propylene Using Multi-Stage Gas Phase Polymerization Reactor)

Homopolymerization of propylene was performed using a multi-stage gas phase polymerization reactor having six stages of reaction regions in the vertical direction, an uppermost stage of which was a fluidized bed and the remaining five stages were spouted beds.

Specifically, the slurry containing the particulate propylene homopolymer produced by the polymerization step 1-a and liquid propylene was transferred from the slurry polymerization reactor to the fluidized bed at the uppermost stage of the multi-staged gas phase polymerization reactor without being deactivated, and continuously supplied.

Inter-stage transfer of the propylene homopolymer in the multi-stage gas phase polymerization reactor was performed by a double valve method. The transfer by the double valve method was performed by connecting an upper reaction region (layer) to a lower reaction region with a 1-inch diameter pipe, disposing two on-off valves in the pipe, opening an upstream valve in a state where a downstream valve was closed, once storing a powder between the upper reaction region and the downstream valve, then closing the upstream valve, and then opening the downstream valve to transfer the particulate propylene homopolymer to the lower reaction region.

Propylene and hydrogen were continuously supplied from a lowermost side of the multi-staged gas phase polymerization reactor having the above configuration. In this way, homopolymerization of propylene was further performed while a fluidized bed or a spouted bed was formed in each reaction region of the multiple stages, the supply amounts of propylene and hydrogen were controlled so as to keep the gas composition and the pressure constant, and an excess gas was discharged. Reaction conditions were as follows.

Polymerization temperature: 60° C.
Polymerization pressure: 1.80 MPa (gauge pressure)
Gas concentration ratio (hydrogen/(hydrogen+propylene)): 6.0 mol %

A product (propylene homopolymer) sampled from an outlet of the multi-stage gas phase polymerization reactor had a limiting viscosity [η]G1 of 1.24 dL/g. The values of [η]L1 and [η]G1 were almost the same. Therefore, the propylene homopolymer produced by performing up to the polymerization step 1-b is the propylene-based polymer a, and [η]G1 is the limiting viscosity of the propylene-based polymer a.

<Polymerization Step 2-a> (Propylene-Ethylene Copolymerization (Gas Phase Polymerization) Using Gas Phase Polymerization Reactor (First Gas Phase Polymerization Reactor))

The propylene-based polymer a discharged from the multi-stage gas phase polymerization reactor used in the polymerization step 1-b was further continuously supplied to a first gas phase polymerization reactor in the subsequent stage. The first gas phase polymerization reactor used in the polymerization step 2-a is a reactor equipped with a gas dispersion plate, and transfer of the propylene-based polymer a from the multi-stage gas phase polymerization reactor to the first gas phase polymerization reactor was performed by the double valve method described above.

While propylene, ethylene, and hydrogen were continuously supplied to the first gas phase polymerization reactor having the above configuration, a gas supply amount was adjusted so as to keep the gas composition and the pressure constant, and an excess gas was discharged, copolymerization of propylene and ethylene was performed in the presence of the propylene-based polymer a particles. Reaction conditions were as follows.

Polymerization temperature: 70° C.
Polymerization pressure: 1.50 MPa (gauge pressure)
Gas concentration ratio (ethylene/(propylene+ethylene)): 45.6 mol %
(hydrogen/(hydrogen+propylene+ethylene)): 3.3 mol %

<Polymerization Step 2-b> (Propylene-Ethylene Copolymerization (Gas Phase Polymerization) Using Gas Phase Polymerization Reactor (Second Gas Phase Polymerization Reactor))

The particles discharged from the first gas phase polymerization reactor used in the polymerization step 2-a were further continuously supplied to a second gas phase polymerization reactor in the subsequent stage. The second gas phase polymerization reactor used in the polymerization step 2-b is a reactor equipped with a gas dispersion plate, and transfer of the particles from the first gas phase polymerization reactor to the second gas phase polymerization reactor was performed by the double valve method described above.

While propylene, ethylene, and hydrogen were continuously supplied to the second gas phase polymerization reactor having the above configuration, a gas supply amount was adjusted so as to keep the gas composition and the pressure constant, and an excess gas was discharged, copolymerization of propylene and ethylene was performed to produce an propylene-ethylene copolymer which is the propylene copolymer b, thereby obtaining a heterophasic propylene polymerization material which is a mixture of the propylene-based polymer a and the propylene copolymer b.

Reaction conditions of the polymerization step 2-b in the second gas phase polymerization reactor were as follows.
Polymerization temperature: 70° C.
Polymerization pressure: 1.20 MPa (gauge pressure)
Gas concentration ratio (ethylene/(propylene+ethylene)): 45.6 mol %
(hydrogen/(hydrogen+propylene+ethylene)): 3.3 mol %
Note that since the polymerization steps 2-a and 2-b were performed under the same conditions of the polymerization temperature and the gas concentration ratio, the propylene-ethylene copolymer produced in the polymerization step 2-a and the propylene-ethylene copolymer produced in the polymerization step 2-b can be regarded as having substantially the same structure.

By performing the polymerization steps 2-a and 2-b as described above, a heterophasic propylene polymerization material further containing "propylene copolymer b" which is a propylene-ethylene copolymer was obtained.

A ratio (X) of the propylene copolymer b in the obtained heterophasic propylene polymerization material was determined by measuring a crystal melting heat quantity of each of the propylene-based polymer a and the whole heterophasic propylene polymerization material, and performing calculation using the following formula. Here, the crystal melting heat quantity was measured by differential scanning calorimetry (DSC).

$$X=1-(\Delta Hf)T/(\Delta Hf)P$$

(ΔHf)T: melting heat quantity (J/g) of the whole heterophasic propylene polymerization material.
(ΔHf)P: melting heat quantity (J/g) of propylene-based polymer a A product (heterophasic propylene polymerization material) sampled from an outlet of the second gas phase polymerization reactor had a limiting viscosity [η]G2 of 1.87 dL/g.

The product obtained from the outlet of the second gas phase polymerization reactor is a mixture of the propylene-based polymer a and the propylene copolymer b. A limiting viscosity [η]C of the propylene copolymer b was calculated by the following formula.

$$[\eta]C=([\eta]G2-[\eta]G1\times(1-X))/X$$

The obtained heterophasic propylene polymerization material had a limiting viscosity ([η]Total) of 1.87 dL/g, an ethylene content of 19.8% by mass, and a propylene content of 80.2% by mass. A polymerization ratio between the propylene-based polymer a and the propylene copolymer b was 54/46 [% by mass/% by mass]. The propylene copolymer b had an ethylene content of 41% by mass, and had a limiting viscosity [η]C of 2.6 dL/g.

<Solid-Gas Separation Step and Catalyst Deactivation Step>

By transferring the heterophasic propylene polymerization material obtained in the above polymerization step 2 from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Step of Drying Particles B>

Using a third drying container 13 illustrated in FIG. 3, a drying step was performed in which a heated nitrogen gas was supplied from a bottom side of the third drying container to dry the particles B by a batch method under the conditions presented in Table 4.

Here, a configuration example of the third drying container 13 will be described with reference to FIG. 3. FIG. 3 is a schematic diagram for explaining a configuration example of the third drying container.

As illustrated in FIG. 3, the third drying container 13 includes a hollow drying container 100 including a cylindrical portion 100A and a conical portion 100E integrally connected to the cylindrical portion 100A and having an inclined surface 100Ea. The drying container 100 can be made of any conventionally known suitable material.

In use, the drying container 100 is disposed such that an apex 100Eb of the conical portion 100E is a lower end portion in the vertical direction, and an end portion of the cylindrical portion 100A on a side opposite to a side where the conical portion 100E is connected is an upper end portion 100Aa. More specifically, the drying container 100 is installed such that a central axis C passing through the apex 100Eb of the conical portion 100E and the center of the upper end portion 100Aa of the cylindrical portion 100A is orthogonal to an installation surface 1 which is a horizontal plane.

To the upper end portion 100Aa of the cylindrical portion 100A of the drying container 100, a supply line 101 is connected. The supply line 101 is configured to introduce a drying target such as particles containing a propylene-based polymer which is a polyolefin into the drying container 100.

Here, an angle θ (referred to as an inclination angle) formed by the inclined surface 100Ea of the conical portion 100E and the installation surface 1 which is a horizontal plane is 60° in Example 4.

A discharge line 102 is connected to a discharge port located at an apex 100Eb of the conical portion 100E of the drying container 100. The discharge line 102 is configured to discharge a drying target that has been subjected to a drying treatment to the outside of the drying container 100.

Note that, in the third drying container 13, a lowermost end serving as a reference for calculating the "bed height" is the apex 100Eb which is a lower end portion of the conical portion 100E.

In the third drying container 13, the discharge line 102 includes a ball valve 103. The ball valve 103 is a functional unit that discharges a drying target that has been subjected to a drying treatment to the outside of the drying container 100 or holds the drying target in the drying container 100 by its opening/closing operation.

When the ball valve 103 is used as described above, the diameter of the discharge port corresponds to the diameter of an opening at the apex 100Eb.

The supply line 101 and the discharge line 102 can each have any conventionally known suitable configuration including a pipe, a valve, and the like. In addition, the supply line 101, the discharge line 102, and the ball valve 103 can be each configured so as to have any suitable arrangement, shape, and size according to a desired aspect.

After the drying step was performed, the ball valve 103 of the third drying container 13 was opened, and the particles B were discharged from the third drying container 13. As a result, the whole amount of the particles B could be stably discharged.

Example 5

Example 5 was performed in a similar manner to Example 4 except that the conditions of the drying step were as illustrated in Table 4 below. Results thereof are presented in Table 4 below.

Example 6

Production of Particles D (Production of Propylene Homopolymer)
<Preliminary Polymerization Step>

Into a stainless steel (SUS) autoclave having an internal volume of 3 L and equipped with a stirrer, 1.9 L of sufficiently dehydrated and deaerated n-hexane, 48 mmol of triethylaluminum (TEA), and 4.8 mmol of tert-butyl-n-propyldimethoxysilane were put.

Into the autoclave, 19 g of a solid catalyst component produced in a similar manner to Example 4 described above was added, and then a preliminary polymerization step of continuously supplying 19 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor and a multi-stage gas phase polymerization reactor were disposed in series and connected to each other was used.

In the main polymerization step, the propylene-based polymer a which is a propylene homopolymer was produced by polymerization in the following polymerization steps 1-a and 1-b.

(Polymerization Step 1-a) (Homopolymerization of Propylene Using Slurry Polymerization Reactor)

Homopolymerization of propylene was performed using a vessel type slurry polymerization reactor made of SUS 304 and equipped with a stirrer.

Specifically, the slurry of propylene, hydrogen, TEA, tert-butyl-n-propyldimethoxysilane, and the above-described preliminary polymerization catalyst component obtained in the preliminary polymerization step was continuously supplied to a slurry polymerization reactor to perform a polymerization reaction. Reaction conditions were as follows.

Polymerization temperature: 50° C.
Stirring speed: 150 rpm
Liquid level in slurry polymerization reactor: 18 L
Supply amount of propylene: 18 kg/hour
Supply amount of hydrogen: 47.1 NL/hour
Supply amount of TEA: 33.0 mmol/hour
Supply amount of tert-butyl-n-propyldimethoxysilane: 6.46 mmol/hour Supply amount of slurry (in terms of solid catalyst component): 0.79 g/hour
Polymerization pressure: 4.09 MPa (gauge pressure)

A product (propylene homopolymer) sampled from an outlet of the slurry polymerization reactor had a limiting viscosity [η]L1 of 0.98 dL/g.

(Polymerization Step 1-b) (Homopolymerization (Gas Phase Polymerization) of Propylene Using Multi-Stage Gas Phase Polymerization Reactor)

Homopolymerization of propylene was performed using a multi-stage gas phase polymerization reactor having six stages of reaction regions in the vertical direction, an uppermost stage of which was a fluidized bed and the remaining five stages were spouted beds.

Specifically, the slurry containing the particulate propylene homopolymer produced by the polymerization step 1-a and liquid propylene was transferred from the slurry polymerization reactor to the fluidized bed at the uppermost stage of the multi-staged gas phase polymerization reactor without being deactivated, and continuously supplied.

Inter-stage transfer of the propylene homopolymer in the multi-stage gas phase polymerization reactor was performed by a double valve method. The transfer by the double valve method was performed by connecting an upper reaction region (layer) to a lower reaction region with a 1-inch diameter pipe, disposing two on-off valves in the pipe, opening an upstream valve in a state where a downstream valve was closed, once storing a powder between the upper reaction region and the downstream valve, then closing the upstream valve, and then opening the downstream valve to transfer the particulate propylene homopolymer to the lower reaction region.

Propylene and hydrogen were continuously supplied from a lowermost side of the multi-staged gas phase polymerization reactor having the above configuration. In this way, homopolymerization of propylene was further performed while a fluidized bed or a spouted bed was formed in each reaction region of the multiple stages, the supply amounts of propylene and hydrogen were controlled so as to keep the gas composition and the pressure constant, and an excess gas was discharged. Reaction conditions were as follows.

Polymerization temperature: 70° C.
Polymerization pressure: 1.79 MPa (gauge pressure)
Gas concentration ratio (hydrogen/(hydrogen+propylene)): 9.5 mol %

A product (propylene homopolymer) sampled from an outlet of the multi-stage gas phase polymerization reactor had a limiting viscosity [η]G1 of 0.96 dL/g. The values of [η]L1 and [η]G1 were almost the same. Therefore, the propylene homopolymer produced by performing up to the polymerization step 1-b is the propylene-based polymer a, and [η]G1 is the limiting viscosity of the propylene-based polymer a.

<Solid-Gas Separation Step and Catalyst Deactivation Step>

By transferring the propylene homopolymer obtained in the above polymerization step 1-b from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Step of Drying Particles D>

Using the third drying container 13 illustrated in FIG. 3, a drying step was performed in which a heated nitrogen gas was supplied from a bottom side of the third drying container to dry particles D by a batch method under the conditions presented in Table 4.

After the drying step was performed, the ball valve 103 of the third drying container 13 was opened, and the particles D were discharged from the third drying container 13. As a result, the whole amount of the particles D could be stably discharged.

Example 7

Production of Particles E (Production of Heterophasic Propylene Polymerization Material)
<Preliminary Polymerization Step>

Into a stainless steel (SUS) autoclave having an internal volume of 3 L and equipped with a stirrer, 1.7 L of sufficiently dehydrated and deaerated n-hexane, 38 mmol of triethylaluminum (TEA), and 7.6 mmol of tert-butyl-n-propyldimethoxysilane were put.

Into the autoclave, 15 g of a solid catalyst component produced in a similar manner to Example 4 described above was added, and then a preliminary polymerization step of continuously supplying 15 g of propylene over about 30 minutes while maintaining the temperature in the autoclave at about 10° C. was performed.

Thereafter, a slurry obtained by the preliminary polymerization step was transferred to a SUS 316L autoclave having an internal volume of 150 L and equipped with a stirrer, and 100 L of liquid butane was further added thereto to obtain a slurry.
<Main Polymerization Step>

In a main polymerization step, an apparatus in which three slurry polymerization reactors and two multi-stage gas phase polymerization reactors were disposed in series and connected to each other was used.

The main polymerization step was performed by polymerization steps 1-a1, 1-a2, 1-a3, 1-b, and 2. Specifically, the main polymerization step was performed by producing a propylene-based polymer a which is a propylene homopolymer in the polymerization steps 1-a1, 1-a2, 1-a3, and 1-b, transferring the produced propylene-based polymer a and a solid catalyst component to a polymerization reactor in the next stage without deactivating the produced propylene-based polymer a and the solid catalyst component, and producing a propylene copolymer b which is an propylene-ethylene copolymer by polymerization in the polymerization step 2. Hereinafter, the polymerization steps 1-a1, 1-a2, 1-a3, 1-b, and 2 will be specifically described.

<Polymerization Step 1-a1> (Homopolymerization of Propylene Using Slurry Polymerization Reactor)

Homopolymerization of propylene was performed using a vessel type slurry polymerization reactor made of SUS 304 and equipped with a stirrer.

Specifically, the slurry of propylene, hydrogen, TEA, tert-butyl-n-propyldimethoxysilane, and the above-described preliminary polymerization catalyst component obtained in the preliminary polymerization step was continuously supplied to a slurry polymerization reactor to perform a polymerization reaction. Reaction conditions were as follows.

Polymerization temperature: 55° C.
Stirring speed: 150 rpm
Liquid level in slurry polymerization reactor: 18 L
Supply amount of propylene: 20 kg/hour
Supply amount of hydrogen: 78.7 NL/hour
Supply amount of TEA: 32.3 mmol/hour Supply amount of tert-butyl-n-propyldimethoxysilane: 6.81 mmol/hour
Supply amount of slurry (in terms of solid catalyst component): 0.55 g/hour
Polymerization pressure: 4.27 MPa (gauge pressure)

(Polymerization Step 1-a2) (Homopolymerization of Propylene Using Slurry Polymerization Reactor)

Homopolymerization of propylene was performed using a vessel type slurry polymerization reactor made of SUS 304 and equipped with a stirrer.

Specifically, the slurry obtained in the polymerization step 1-a1 was continuously supplied to a slurry polymerization reactor to perform a polymerization reaction. Reaction conditions were as follows.

Polymerization temperature: 54° C.
Stirring speed: 150 rpm
Liquid level in slurry polymerization reactor: 55 L
Supply amount of propylene: 15 kg/hour
Supply amount of hydrogen: 57.3 NL/hour
Polymerization pressure: 3.28 MPa (gauge pressure)

(Polymerization step 1-a3) (Homopolymerization of propylene using slurry polymerization reactor)

Homopolymerization of propylene was performed using a vessel type slurry polymerization reactor made of SUS 304 and equipped with a stirrer.

Specifically, the slurry obtained in the polymerization step 1-a2 was continuously supplied to a slurry polymerization reactor to perform a polymerization reaction. Reaction conditions were as follows.

Polymerization temperature: 50° C.
Stirring speed: 150 rpm
Liquid level in slurry polymerization reactor: 55 L
Supply amount of propylene: 3 kg/hour
Polymerization pressure: 3.06 MPa (gauge pressure)

A product (propylene homopolymer) sampled from an outlet of the slurry polymerization reactor had a limiting viscosity $[\eta]L1$ of 0.94 dL/g.

<Polymerization Step 1-b> (Homopolymerization (Gas Phase Polymerization) of Propylene Using Gas Phase Polymerization Reactor)

The slurry obtained in the polymerization step 1-a3 was further continuously supplied to a gas phase polymerization reactor in the subsequent stage. The gas phase polymerization reactor used in the polymerization step 1-b is a reactor equipped with a gas dispersion plate.

Propylene and hydrogen were continuously supplied from a lowermost side of the gas phase polymerization reactor. In this way, homopolymerization of propylene was further performed while a fluidized bed was formed in each reaction region of the multiple stages, the supply amounts of propylene and hydrogen were controlled so as to keep the gas composition and the pressure constant, and an excess gas was discharged. Reaction conditions were as follows.

Polymerization temperature: 70° C.
Polymerization pressure: 1.94 MPa (gauge pressure)
Gas concentration ratio (hydrogen/(hydrogen+propylene)): 8.5 mol %

A product (propylene homopolymer) sampled from an outlet of the gas phase polymerization reactor had a limiting viscosity $[\eta]G1$ of 0.95 dL/g. The values of $[\eta]L1$ and $[\eta]G1$ were almost the same. Therefore, the propylene homopolymer produced by performing up to the polymerization step 1-b is the propylene-based polymer a, and $[\eta]G1$ is the limiting viscosity of the propylene-based polymer a.

<Polymerization Step 2> (Propylene-Ethylene Copolymerization (Gas Phase Polymerization) Using Gas Phase Polymerization Reactor)

The propylene-based polymer a discharged from the gas phase polymerization reactor used in the polymerization step 1-b was further continuously supplied to a gas phase polymerization reactor in the subsequent stage. The gas phase polymerization reactor used in the polymerization step 2 is a reactor equipped with a gas dispersion plate.

While propylene, ethylene, and hydrogen were continuously supplied to the gas phase polymerization reactor having the above configuration, a gas supply amount was adjusted so as to keep the gas composition and the pressure constant, and an excess gas was discharged, copolymerization of propylene and ethylene was performed in the presence of the propylene-based polymer a (particles) to produce an propylene-ethylene copolymer which is the propylene copolymer b, thereby obtaining a heterophasic propylene polymerization material which is a mixture of the propylene-based polymer a and the propylene copolymer b. Reaction conditions were as follows.

Polymerization temperature: 70° C.
Polymerization pressure: 1.40 MPa (gauge pressure)
Gas concentration ratio (ethylene/(propylene+ethylene)): 27.9 mol %
(hydrogen/(hydrogen+propylene+ethylene)): 0.09 mol %

A ratio (X) of the propylene copolymer b in the obtained heterophasic propylene polymerization material was determined by measuring a crystal melting heat quantity of each of the propylene-based polymer a and the whole heterophasic propylene polymerization material, and performing calculation using the following formula. Here, the crystal melting heat quantity was measured by differential scanning calorimetry (DSC).

$$X=1-(\Delta Hf)T/(\Delta Hf)P$$

$(\Delta Hf)T$: melting heat quantity (J/g) of the whole heterophasic propylene polymerization material.
$(\Delta Hf)P$: melting heat quantity (J/g) of propylene-based polymer a A product (heterophasic propylene polymerization material) sampled from an outlet of the gas phase polymerization reactor had a limiting viscosity [η]G2 of 2.07 dL/g.

The product obtained from the outlet of the gas phase polymerization reactor is a mixture of the propylene-based polymer a and the propylene copolymer b. A limiting viscosity [η]C of the propylene copolymer b was calculated by the following formula.

$$[\eta]C=([\eta]G2-[\eta]G1\times(1-X))/X$$

The obtained heterophasic propylene polymerization material had a limiting viscosity ([η]Total) of 2.07 dL/g, an ethylene content of 5.1% by mass, and a propylene content of 94.9% by mass. A polymerization ratio between the propylene-based polymer a and the propylene copolymer b was 86/14 [% by mass/% by mass]. The propylene copolymer b had an ethylene content of 36% by mass, and had a limiting viscosity [η]C of 8.8 dL/g.

<Solid-Gas Separation Step and Catalyst Deactivation Step>

By transferring the heterophasic propylene polymerization material obtained in the above polymerization step 2 from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Step of Drying Particles E>

Using the third drying container 13, a drying step was performed in which a heated nitrogen gas was supplied from a bottom side of the third drying container 13 to dry particles E by a batch method under the conditions presented in Table 4. Note that the configuration of the third drying container 13 in this example is as described above with reference to FIG. 3. Note that the third drying container 13 had an apparatus diameter of 0.4 m, an inclination angle θ of 67.5°, and a discharge port diameter of 0.11 m.

After the drying step was performed, the ball valve 103 of the third drying container 13 was opened, and the particles E were discharged from the third drying container 13. As a result, the whole amount of the particles E could be stably discharged.

Comparative Example 3

Production of Particles C (Production of Heterophasic Propylene Polymerization Material)

<Preliminary Polymerization Step>

Into a stainless steel (SUS) autoclave having an internal volume of 3 L and equipped with a stirrer, 1.0 L of sufficiently dehydrated and deaerated n-hexane, 19 mmol of triethylaluminum (TEA), and 1.9 mmol of tert-butyl-n-propyldimethoxysilane were put.

Into the autoclave, 7 g of a solid catalyst component produced in a similar manner to Example 4 described above was added, and then a preliminary polymerization step of continuously supplying 7 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor, a multi-stage gas phase polymerization reactor, and two gas phase polymerization reactors were disposed in series and connected to each other was used.

The main polymerization step was performed by polymerization steps 1-a, 1-b, 2-a, and 2-b. Specifically, the main polymerization step was performed by producing a propylene-based polymer a which is an propylene-ethylene copolymer in the polymerization steps 1-a and 1-b, transferring the produced propylene-based polymer a and the solid catalyst component to a polymerization reactor in the next stage without deactivating the produced propylene-based polymer a and the solid catalyst component, and producing a propylene copolymer b which is an propylene-ethylene copolymer by polymerization in the polymerization steps 2-a and 2-b. Hereinafter, the polymerization steps 1-a, 1-b, 2-a, and 2-b will be specifically described.

<Polymerization Step 1-a> (Propylene-Ethylene Copolymerization Using Slurry Polymerization Reactor)

Propylene-ethylene copolymerization was performed using a vessel type slurry polymerization reactor made of SUS 304 and equipped with a stirrer.

Specifically, the slurry of propylene, hydrogen, ethylene, TEA, tert-butyl-n-propyldimethoxysilane, and the above-described preliminary polymerization catalyst component obtained in the preliminary polymerization step was continuously supplied to a slurry polymerization reactor to perform a polymerization reaction. Reaction conditions were as follows.

Polymerization temperature: 50° C.
Stirring speed: 150 rpm
Liquid level in slurry polymerization reactor: 18 L
Supply amount of propylene: 30 kg/hour
Supply amount of hydrogen: 5.4 NL/hour
Supply amount of ethylene: 0.045 kg/hour
Supply amount of TEA: 17.9 mmol/hour
Supply amount of tert-butyl-n-propyldimethoxysilane: 3.58 mmol/hour
Supply amount of slurry (in terms of solid catalyst component): 0.35 g/hour
Polymerization pressure: 3.04 MPa (gauge pressure)

A product (propylene-ethylene copolymer) sampled from an outlet of the slurry polymerization reactor had a limiting viscosity $[\eta]L1$ of 2.13 dL/g.

The product (propylene-ethylene copolymer) sampled from the outlet of the slurry polymerization reactor had an ethylene content C2'L of 1.3% by mass.

<Polymerization Step 1-b> (Propylene-Ethylene Copolymerization (Gas Phase Polymerization) Using Multi-Stage Gas Phase Polymerization Reactor)

Propylene-ethylene copolymerization was performed using a multi-stage gas phase polymerization reactor having six stages of reaction regions in the vertical direction, an uppermost stage of which was a fluidized bed and the remaining five stages were spouted beds.

Specifically, the slurry containing the particulate propylene homopolymer produced by the polymerization step 1-a and liquid propylene was transferred from the slurry polymerization reactor to the fluidized bed at the uppermost stage of the multi-staged gas phase polymerization reactor without being deactivated, and continuously supplied.

Inter-stage transfer of the propylene-based polymer in the multi-stage gas phase polymerization reactor was performed by a double valve method. The transfer by the double valve method was performed by connecting an upper reaction region (layer) to a lower reaction region with a 1-inch diameter pipe, disposing two on-off valves in the pipe, opening an upstream valve in a state where a downstream valve was closed, once storing a powder between the upper reaction region and the downstream valve, then closing the upstream valve, and then opening the downstream valve to transfer the particulate propylene-based polymer to the lower reaction region.

Propylene, ethylene, and hydrogen were continuously supplied from a lowermost side of the multi-staged gas phase polymerization reactor having the above configuration. In this way, propylene-ethylene copolymerization was further performed while a fluidized bed or a spouted bed was formed in each reaction region of the multiple stages, the supply amounts of propylene, ethylene, and hydrogen were controlled so as to keep the gas composition and the pressure constant, and an excess gas was discharged. Reaction conditions were as follows.

Polymerization temperature: 57° C.
Polymerization pressure: 1.70 MPa (gauge pressure)
Gas concentration ratio (ethylene/(propylene+ethylene)): 4.2 mol %
Gas concentration ratio (hydrogen/(hydrogen+propylene+ethylene)): 1.1 mol %

A product (propylene-based polymer a) sampled from an outlet of the multi-stage gas phase polymerization reactor had a limiting viscosity $[\eta]G1$ of 2.26 dL/g. The values of $[\eta]L1$ and $[\eta]G1$ were almost the same. Therefore, the propylene homopolymer produced by performing up to the polymerization step 1-b is the propylene-based polymer a, and $[\eta]G1$ is the limiting viscosity of the propylene-based polymer a.

A product (propylene-based polymer a) sampled from the outlet of the multi-stage gas phase polymerization reactor had an ethylene content C2'G1 of 5.7% by mass. Here, the propylene homopolymer produced by performing up to the polymerization step 1-b is the propylene-based polymer a, and the ethylene content C2'G1 is an ethylene content of the propylene-based polymer a.

<Polymerization Step 2-a> (Propylene-Ethylene Copolymerization (Gas Phase Polymerization) Using First Gas Phase Polymerization Reactor)

The propylene-based polymer a discharged from the multi-stage gas phase polymerization reactor used in the polymerization step 1-b was further continuously supplied to a first gas phase polymerization reactor in the subsequent stage. The first gas phase polymerization reactor used in the polymerization step 2-a is a reactor equipped with a gas dispersion plate, and transfer of the propylene-based polymer a from the multi-stage gas phase polymerization reactor to the first gas phase polymerization reactor was performed by the double valve method described above.

While propylene, ethylene, and hydrogen were continuously supplied to the first gas phase polymerization reactor having the above configuration, a gas supply amount was adjusted so as to keep the gas composition and the pressure constant, and an excess gas was discharged, copolymerization of propylene and ethylene was performed in the presence of the propylene-based polymer a particles to produce an propylene-ethylene copolymer which is the propylene copolymer b, thereby obtaining a heterophasic propylene polymerization material which is a mixture of the propylene-based polymer a and the propylene copolymer b. Reaction conditions were as follows.

Polymerization temperature: 70° C.
Polymerization pressure: 1.67 MPa (gauge pressure)
Gas concentration ratio (ethylene/(propylene+ethylene)): 21.8 mol %
(hydrogen/(hydrogen+propylene+ethylene)): 1.4 mol %

<Polymerization Step 2-b> (Propylene-Ethylene Copolymerization (Gas Phase Polymerization) Using Gas Phase Polymerization Reactor (Second Gas Phase Polymerization Reactor))

The particles discharged from the first gas phase polymerization reactor used in the polymerization step 2-a were further continuously supplied to a second gas phase polymerization reactor in the subsequent stage. The second gas phase polymerization reactor used in the polymerization step 2-b is a reactor equipped with a gas dispersion plate, and transfer of the particles from the first gas phase polymerization reactor to the second gas phase polymerization reactor was performed by the double valve method described above.

While propylene, ethylene, and hydrogen were continuously supplied to the second gas phase polymerization reactor having the above configuration, a gas supply amount was adjusted so as to keep the gas composition and the pressure constant, and an excess gas was discharged, copolymerization of propylene and ethylene was performed to produce an propylene-ethylene copolymer which is the propylene copolymer b, thereby obtaining a heterophasic propylene polymerization material which is a mixture of the propylene-based polymer a and the propylene copolymer b.

Reaction conditions of the polymerization step 2-b in the second gas phase polymerization reactor were as follows.
Polymerization temperature: 70° C.
Polymerization pressure: 1.63 MPa (gauge pressure)
Gas concentration ratio (ethylene/(propylene+ethylene)): 21.8 mol %
(hydrogen/(hydrogen+propylene+ethylene)): 1.4 mol %

Note that since the polymerization steps 2-a and 2-b were performed under the same conditions of the polymerization temperature and the gas concentration ratio, the propylene-ethylene copolymer produced in the polymerization step 2-a and the propylene-ethylene copolymer produced in the polymerization step 2-b can be regarded as having substantially the same structure.

By performing the polymerization steps 2-a and 2-b as described above, a heterophasic propylene polymerization material further containing "propylene copolymer b" which is a propylene-ethylene copolymer was obtained.

A ratio (X) of the propylene copolymer b in the obtained heterophasic propylene polymerization material was determined by measuring a crystal melting heat quantity of each of the propylene-based polymer a and the whole heterophasic propylene polymerization material, and performing calculation using the following formula. Here, the crystal melting heat quantity was measured by differential scanning calorimetry (DSC).

$$X = 1 - (\Delta Hf)T/(\Delta Hf)P$$

($\Delta Hf$)T: melting heat quantity (J/g) of the whole heterophasic propylene polymerization material.
($\Delta Hf$) P: melting heat quantity (J/g) of propylene-based polymer a A product (heterophasic propylene polymerization material) sampled from an outlet of the second gas phase polymerization reactor had a limiting viscosity [η]G2 of 2.70 dL/g.

The product obtained from the outlet of the second gas phase polymerization reactor is a mixture of the propylene-based polymer a and the propylene copolymer b. A limiting viscosity [η]C of the propylene copolymer b was calculated by the following formula.

$$[\eta]C = ([\eta]G2 - [\eta]G1 \times (1-X))/X$$

The product obtained from the outlet of the second gas phase polymerization reactor is a mixture of the propylene-based polymer a and the propylene copolymer b. An ethylene content C2' C of the propylene copolymer b was calculated by the following formula.

$$C2'C = (C2'G2 - C2'G1 \times (1-X))/X$$

The obtained heterophasic propylene polymerization material had a limiting viscosity ([η]Total) of 2.70 dL/g, an ethylene content (C2'G2) of 17.6% by mass, and a propylene content of 82.4% by mass. A polymerization ratio between the propylene-based polymer a and the propylene copolymer b was 34/66. The propylene copolymer b had an ethylene content C2'C of 24% by mass, and had a limiting viscosity [η]C of 2.9 dL/g.

<Solid-Gas Separation Step and Catalyst Deactivation Step>

By transferring the heterophasic propylene polymerization material obtained in the above polymerization step 2 from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Step of Drying Particles C>

Using the third drying container 13 illustrated in FIG. 3 described above, a drying step was performed in which a heated nitrogen gas was supplied from a bottom side of the third drying container to dry particles C by a batch method under the conditions presented in Table 4.

After the drying step was performed, the ball valve 103 of the third drying container 13 was opened, and the particles C were discharged from the third drying container 13. As a result, the particles C could not be discharged from the third drying container 13 at all.

TABLE 4

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Polyolefin-containing particles | | Particles A | Particles A | Particles A | Particles B | Particles B | Particles D | Particles E | Particles A | Particles A | Particles C |
| Drying container | | First drying container | Second drying container | Second drying container | Third drying container | Third drying container | Third drying container | Fourth drying container | First drying container | First drying container | Third drying container |
| Particle diameter | [μm] | 3672 | 3672 | 3672 | 2658 | 2658 | 1536 | 1914 | 3672 | 3672 | 2436 |
| Apparatus diameter (Cylindrical portion) d | [m] | 1.6 | 1.2 | 1.2 | 0.6 | 0.6 | 0.6 | 0.4 | 1.6 | 1.6 | 0.6 |
| Bed height L | [m] | 1.19 | 1.2 | 1.2 | 0.72 | 0.72 | 0.645 | 0.992 | 1.19 | 1.19 | 1.02 |
| L/d | [m/m] | 0.7 | 1.0 | 1.0 | 1.2 | 1.2 | 1.1 | 2.5 | 0.7 | 0.7 | 1.7 |
| Diameter of discharge port | [m] | 1.20 | 1.20 | 1.20 | 0.14 | 0.14 | 0.14 | 0.11 | 1.20 | 1.20 | 0.14 |
| Residence time | [hr] | 1.5 | 10 | 19 | 1 | 4 | 1 | 1 | 10 | 15 | 1 |
| Temperature | [° C.] | 25 | 92 | 110 | 60 | 60 | 60 | 60 | 119 | 92 | 60 |
| | [K] | 298 | 365 | 383 | 333 | 333 | 333 | 333 | 392 | 365 | 333 |

TABLE 4-continued

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Inclination angle | [°] | 70 | 90 | 90 | 60 | 60 | 60 | 67.5 | 70 | 70 | 60 |
| CXS component amount | [% by mass] | 38 | 38 | 38 | 34 | 34 | 0.33 | 12.4 | 38 | 38 | 52 |
| Dischargeability | [—] | ○ | ○ | ○ | ○ | ○ | ○ | ○ | x Defective discharge Rat hole is generated in drying container | x Defective discharge Rat hole is generated in drying container | x Discharge cannot be performed |
| Value of formula (a) |  | 0.721 | 0.797 | 0.996 | 0.796 | 0.850 | 0.084 | 0.258 | 1.073 | 1.105 | 1.178 |

As described above, according to Examples 1 to 7 in which the values determined by formula (a) were −0.20 or more and 1.05 or less (0.258 to 0.996), the whole amount of the dried particles could be stably discharged to the outside of the drying container. On the other hand, according to Comparative Examples 1 and 2, a defective discharge state was obtained in which the whole amount of the dried particles could not be discharged to the outside of the drying container, and the particles retained in the drying container formed rat holes. According to Comparative Example 3, the particles C could not be discharged from the drying container at all.

Example 8

Example 8 was performed in a similar manner to Example 6 except that the conditions of the drying step were as presented in Table 5 below. Results thereof are presented in Table 5 below.

Comparative Example 4

The inclination angle of the drying container in Example 8 was changed to 89°. When the weight of the particles D put into the drying container in the drying step is similar to that in Example 8, the bed height is 6.44 m.

As described above, L/D is 2.5 in Example 8, whereas L/D is 10.7 in Comparative Example 4. When L/D is large, the height of the drying container in the vertical direction is high, and as a result, for example, the length of a pipe is long or necessary power is large, which is not preferable.

TABLE 5

|  |  | Example 8 | Comparative Example 4 |
|---|---|---|---|
| Polyolefin-containing particles |  | Particles D | Particles D |
| Drying container |  | Third drying container | Third drying container |
| Particle diameter | [pm] | 1536 | 1536 |
| Apparatus diameter (cylindrical portion) d | [m] | 0.6 | 0.6 |
| Bed height L | [m] | 1.50 | 6.44 |
| L/d | [m/m] | 2.5 | 10.7 |
| Diameter of discharge port | [m] | 0.14 | 0.14 |
| Residence time | [hr] | 1 | 1 |
| Temperature | [° C.] | 60 | 60 |
|  | [K] | 333 | 333 |
| Inclination angle | [°] | 60 | 89 |
| CXS component amount | [% by mass] | 0.33 | 0.33 |

TABLE 5-continued

|  |  | Example 8 | Comparative Example 4 |
|---|---|---|---|
| Dischargeability | [–] | — | — |
| Value of formula (a) |  | 0.086 | −0.217 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for discharging polyolefin-containing particles to the outside of a container, wherein the method comprises supplying a container comprising polyolefin-containing particle, drying and/or storing the polyolefin-containing particles in the container, and discharging the polyolefin-containing particles from the container, wherein in the container, a value determined by the following formula (a) is −0.20 or more and 1.05 or less;

$$0.00304 \times \text{apparatus diameter [m]} + 0.00261 \times \text{bed height [m]} + 0.0179 \times \text{residence time [hr]} + 0.00213 \times \text{particle temperature in drying container [K]} - 0.0109 \times \text{inclination angle [degree]} + 0.0212 \times \text{CXS (cold xylene soluble) component amount [\% by mass]} \quad \text{Formula (a):}$$

wherein in formula (a), the apparatus diameter represents a maximum diameter of a body portion of the container, the bed height represents a maximum height from a height of a discharge port for discharging the polyolefin-containing particles to a height at which the polyolefin-containing particles retained in the container are located, the residence time represents a time during which the polyolefin-containing particles are retained in the container, the particle temperature in the container represents a temperature of the polyolefin-containing particles in the container, the inclination angle represents an external angle formed by an inclined surface of the container and an installation horizontal surface of the container, the external angle referring to an angle on an outer side of the container, and the CXS component amount represents a content of the CXS component in the polyolefin-containing particles.

2. The method for discharging polyolefin-containing particles according to claim 1, wherein the polyolefin contains a propylene-based polymer.

3. The method for discharging polyolefin-containing particles according to claim 2, wherein
the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and olefins having 4 to 12 carbon atoms is 5% by mass or more and 50% by mass or less, and
the content of the CXS component in the polyolefin-containing particles is 5% by mass or more.

4. The method for discharging polyolefin-containing particles according to claim 3, wherein
the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and α-olefins having 4 to 12 carbon atoms is 20% by mass or more and 50% by mass or less, and
the content of the CXS component in the polyolefin-containing particles is 15% by mass or more.

5. The method for discharging polyolefin-containing particles according to claim 2, wherein
the propylene-based polymer is a polymer in which a mass ratio of a propylene-derived structural unit is 50% by mass or more and 95% by mass or less, and a mass ratio of a structural unit derived from at least one type of olefin selected from the group consisting of ethylene and α-olefins having 4 to 12 carbon atoms is 5% by mass or more and 50% by mass or less, and
the content of the CXS component in the polyolefin-containing particles is 5% by mass or more.

6. The method for discharging polyolefin-containing particles according to claim 5, wherein
the propylene-based polymer is a polymer in which a mass ratio of a propylene-derived structural unit is 50% by mass or more and 80% by mass or less, and a mass ratio of a structural unit derived from at least one type of olefin selected from the group consisting of ethylene and α-olefins having 4 to 12 carbon atoms is 20% by mass or more and 50% by mass or less, and
the content of the CXS component in the polyolefin-containing particles is 15% by mass or more.

7. The method for discharging polyolefin-containing particles according to claim 1, wherein the temperature of the polyolefin-containing particles in the container is 0° C. or higher and 160° C. or lower.

8. The method for discharging polyolefin-containing particles according to claim 1, wherein the polyolefin-containing particles in the container have a residence time of one hour or more and 48 hours or less.

9. The method for discharging polyolefin-containing particles according to claim 1, wherein the inclination angle in the container is 30° or more.

10. The method for discharging polyolefin-containing particles according to claim 1, wherein the polyolefin-containing particles have a median diameter of 500 μm or more and 10,000 μm or less.

11. A method for producing polyolefin-containing particles, the method comprising a step of discharging the polyolefin-containing particles by the method according to claim 1.

12. A method for producing a polyolefin-based resin composition, the method comprising a step of discharging the polyolefin-containing particles by the method according to claim 1.

* * * * *